United States Patent
Yanagawa et al.

(10) Patent No.: US 6,844,886 B1
(45) Date of Patent: Jan. 18, 2005

(54) NETWORK CONTROL SYSTEM

(75) Inventors: Yoshifumi Yanagawa, Kyoto (JP); Seiichi Suzuki, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/581,748

(22) PCT Filed: Oct. 19, 1999

(86) PCT No.: PCT/JP99/05736

§ 371 (c)(1), (2), (4) Date: Jun. 16, 2000

(87) PCT Pub. No.: WO00/24222

PCT Pub. Date: Apr. 27, 2000

(30) Foreign Application Priority Data

Oct. 20, 1998 (JP) ............................................ 10-297792

(51) Int. Cl.$^7$ ........................... G09G 5/00; G06F 15/173
(52) U.S. Cl. ...................... 345/744; 345/716; 345/740; 345/771; 345/790; 345/969; 345/736; 709/223
(58) Field of Search ................................ 345/700, 716, 345/733–740, 744, 764, 771, 781, 788, 790, 794, 803, 810, 835, 853, 856, 969; 709/203, 223, 224

(56) References Cited

U.S. PATENT DOCUMENTS

| | | | |
|---|---|---|---|
| 5,261,044 A | * 11/1993 | Dev et al. ..................... 345/855 |
| 5,283,861 A | * 2/1994 | Dangler et al. ............... 345/740 |
| 5,353,399 A | * 10/1994 | Kuwamoto et al. ......... 345/736 |
| 5,857,206 A | * 1/1999 | Tsutsumitake ............... 707/203 |
| 5,883,621 A | * 3/1999 | Iwamura ...................... 725/37 |
| 5,887,193 A | 3/1999 | Takahashi et al. ............. 710/8 |
| 6,131,111 A | * 10/2000 | Yoshino et al. ............. 709/204 |
| 6,546,419 B1 | * 4/2003 | Humpleman et al. ....... 709/223 |
| 6,691,150 B1 | 2/2004 | Yoshino et al. |
| 6,745,252 B1 | * 6/2004 | Yanagawa et al. ............. 710/8 |
| 6,765,590 B1 | * 7/2004 | Watahiki et al. ............ 345/716 |
| 2004/0103184 A1 | * 5/2004 | Humpleman et al. ....... 709/223 |

FOREIGN PATENT DOCUMENTS

| | | |
|---|---|---|
| EP | 0 853 402 | 7/1998 |
| JP | 7-44477 | 2/1995 |
| JP | 9-149325 | 6/1997 |
| JP | 10-240666 | 9/1998 |

OTHER PUBLICATIONS

"11.3 Introduction to Image Map", CGI Programming, O'Reilly Japan Inc., Second printing of the first edition, Jan. 10, 1997, pp. 359–361 (with its English translation).
CGI Programming, 1st Edition, second pring (Japan), Kabushiki Kaisha Orairi Japan, (Jan. 10, 1997), pp 359–361, 11.3 An Introduction to Image Map.

* cited by examiner

Primary Examiner—Sy D. Luu
(74) Attorney, Agent, or Firm—Wenderoth, Lind & Ponack, L.L.P.

(57) ABSTRACT

In a network control system, a device has screen display data indicative of its operating screen, and a controller issues a screen request (101) to obtain the screen display data, etc., as screen information (111) from the device. By using the screen display data, etc., the controller displays the operating screen. When an operation is carried out to the operating screen, its operation information and identification information of the screen display data are sent to the device as operation request (241). The device executes a function corresponding to the operation request. As a result, when the screen display data in the device is changed, the device sends the changed screen display data, etc., to the controller as screen information (121).

45 Claims, 19 Drawing Sheets

500 SCREEN DISPLAY

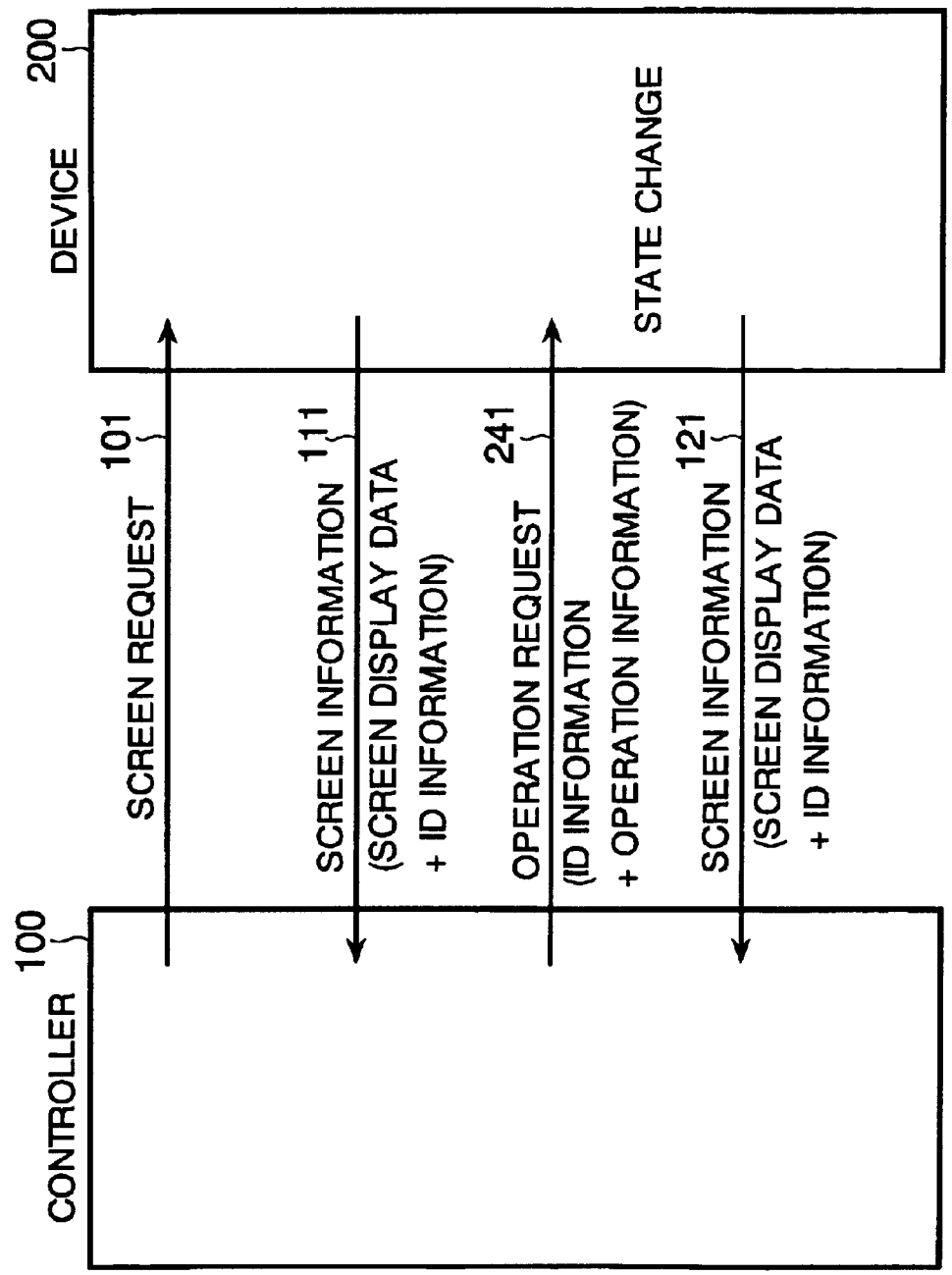

Fig. 12

| | SCREEN DISPLAY | FIRST SCREEN PARTIAL DISPLAY | SECOND SCREEN PARTIAL DISPLAY | THIRD SCREEN PARTIAL DISPLAY |
|---|---|---|---|---|
| INITIAL VALUE | 0 | 0 | 0 | 0 |
| AFTER SECOND PARTIAL SCREEN DISPLAY DATA IS CHANGED | 1 | 0 | 1 | 0 |
| AFTER THIRD PARTIAL SCREEN DISPLAY DATA IS CHANGED | 2 | 0 | 1 | 2 |
| AFTER SECOND PARTIAL SCREEN DISPLAY DATA IS CHANGED | 3 | 0 | 3 | 2 |
| AFTER SECOND PARTIAL SCREEN DISPLAY DATA IS CHANGED | 4 | 0 | 4 | 2 |
| AFTER FIRST PARTIAL SCREEN DISPLAY DATA IS CHANGED | 5 | 5 | 4 | 2 |
| ⋮ | ⋮ | ⋮ | ⋮ | ⋮ |

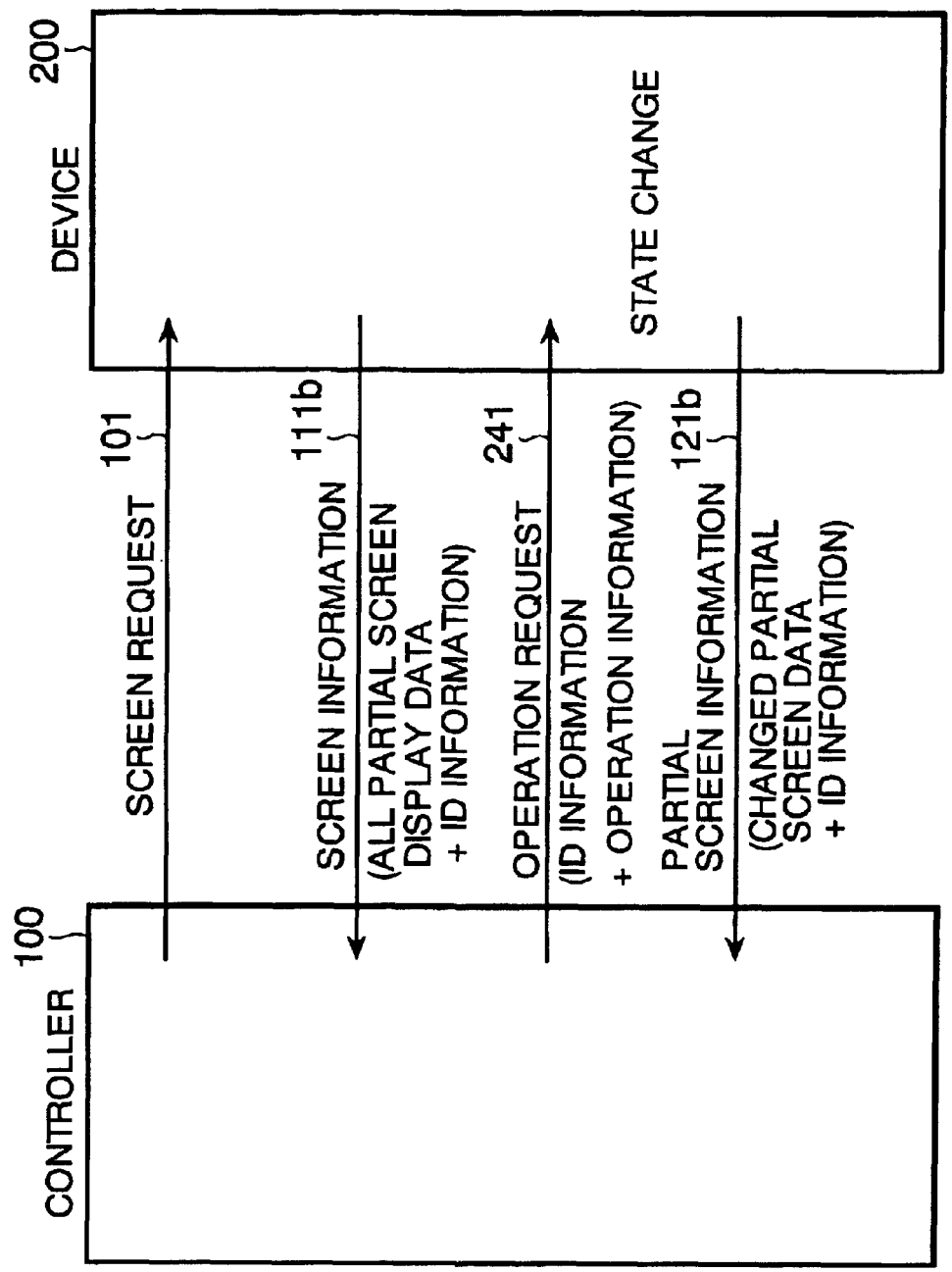

NETWORK CONTROL SYSTEM

TECHNICAL FIELD

The present invention relates to network control systems in which a device connected to a network is operated through a network and, more specifically, a device control system with a graphical user interface (GUI) supporting user's device operation through graphics, characters, etc., on a screen.

BACKGROUND ART

In recent years, device control systems for controlling devices by selectively operating, through a remote controller, device control graphics (icons) composed of screen display data and characters indicating functions of the devices on a TV (Television) screen have made their appearance. Also, network systems with digital devices such as a DVD connected thereto using IEEE 1394-1995 for transmitting and receiving video/audio data have been emerging.

One example of conventional network control systems is disclosed in Japanese Patent Laying-Open No.H9-149325 (1997-149325).

This conventional network control system is now described below.

Similarly to digital interfaces according to IEEE 1394 standards, etc., AV units are connected to each other without switching by a bilateral packet communications system with a serial bus that periodically provides an equal communication opportunity to the devices.

Here, each AV unit stores its own screen display data. By request from a controller having a graphic display function (television receiver), each AV unit transmits the screen display data to the controller. The controller displays the received screen display data. The controller further has the functions of inquiring for data required for indicating the AV unit connected thereto and controlling the display screen based on the screen display data from the AV unit. Each AV unit has a recording medium for storing the screen display data, and a function of selecting the appropriate screen display data in response to the inquiry from the controller for the screen display data.

In the above structured network control system, the screen display data is held in each device (AV unit), and outputted according to a display request from the controller (television receiver). Graphics unique to each device (AV unit) are thus displayed on the screen of the controller.

In the above described structure, however, when the display on an operating screen is to be changed due to internal state changes in the device, the device cannot report its change of state to the controller, thereby causing a mismatch in display screen information between the controller and the device. For this reason, the controller cannot correctly provide a user with device operation information.

In view of the above problem, an object of the present invention is to provide a network control system in which a device can quickly report to a controller about a change of the device's internal state that causes a change of display on an operating screen to ensure the controller and the device can share the same state information. Such network control system is herein achieved with simple structure and small transmission load on a communication path.

DISCLOSURE OF THE INVENTION

A first aspect of the present invention is directed to a network control system in which a first unit and a second unit are connected to each other a transmission path and a controller included in the first unit controls a device in the second unit through the transmission path. At least one of the first unit and the second unit handle at least one of video, audio, and information. The device has screen display data for displaying an operating screen of the device and identification information for identifying the screen display data. The device further transmits the screen display data and the identification information to the controller through the transmission path. The controller comprises a user interface including display means, receives the screen display data and the identification information from the device through the transmission path, and displays the operating screen on the display means using the screen display data. In response to an operation by a user to the operating screen, the controller controls the device by transmitting operation information indicative of the operation and the identification information to the device through the transmission path.

A second aspect of the present invention is directed to a network control system in which a first unit and a second unit are connected to each other a transmission path and a controller included in the first unit controls a device in the second unit through the transmission path. At least one of the first unit and the second unit being for handling at least one of video, audio, and information. The device has screen display data for displaying an operating screen of the device and identification information for identifying the screen display data, and transmits the screen display data and the identification information to the controller through the transmission path. The controller comprises a user interface including display means, receives the screen display data and the identification information from the device through the transmission path, and displays the operating screen on the display means using the screen display data and the identification information. In response to an operation by a user to the operating screen, the controller controls the device by transmitting operation information indicative of the operation and the identification information to the device through the transmission path.

According to the first or second aspect of the present invention, by identifying the screen display data with the identification information, the device can easily and reliably recognize to which screen display data the user operation information sent by the controller is directed, thereby preventing erroneous operation of the device. Further, according to the first or second aspect, the controller manages the screen display data representing the operating screen of the device, and transmits the operation information based on the user's operation. However, the controller does not have to understand the meaning of the function of the device or the operation (the relation between the operation and the function of the device). In other words, user interface information (screen display data, operation information, etc.,) is managed and processed by the controller, while control information directly related to device control (information indicating the function of the device, information indicating the relation between the function of the device and the operation, etc.,) is by the device. Therefore, the processing in the controller is reduced, and the types of operation for controlling the device by the controller are not limited but can be varied. Furthermore, according to the first or second aspect, the controller obtains the screen display data representing the operating screen of the device and the identification information from the device and displays the operating screen of the device using the obtained data and information. Therefore, even if the device has a new function that cannot be presently assumed, only by sending the screen display data corresponding the new function from the device to the controller, the new function can be easily provided for and is made available to the user.

According to a third aspect of the present invention, further to the first or second aspect, the identification information includes version information indicating a version of the screen display data.

According to the third aspect of the present invention, the identification information obtained by the controller from the device includes the version information. Therefore, the controller can detect a change in the operating screen information of the device, and thereby can easily detects that the state of the device is changed based on instructions from other controller or voluntary change in the device. Further, according to the user's operation, the version information of the screen display data representing the operating screen is sent with the operation information to the device. Therefore, the device can easily and reliably understand to which operating screen the operation is directed, thereby executing the operation desired by the user. Further, according to the third aspect, when receiving the screen display data, the controller checks the version information thereof, and updates display only when the version information is correctly updated. Therefore, it is possible to reduce a load on the controller when the same screen display data is transmitted again and again.

According to a fourth aspect of the present invention, further to the first or second aspect, the operation information includes an operating position information indicative of an operating position on the operating screen.

According to the fourth aspect of the present invention, the operation information that is sent to the device according to the user's operation includes the operating position information indicating the operating position on the operating screen. Therefore, in the operation to the operating screen, a desired operating position can be directly specified by a pointing device. Thus, operability for device control is improved.

A fifth aspect of the present invention is directed to a network control system in which a first unit and a second unit are connected to each other a transmission path and a controller included in the first unit controls a device in the second unit through the transmission path. At least one of the first unit and the second unit handle at least one of video, audio, and information. The device has screen display data composed of a plurality of partial screen display data for displaying an operating screen of the device and transmits the partial screen display data to the controller through the transmission path. The controller comprises a user interface including display means, receives the partial screen display data from the device through the transmission path and displays the operating screen on the display means using the partial screen display data. In response to an operation by a user to the operating screen, the controller controls the device by transmitting operation information indicative of the operation to the device through the transmission path.

According to the fifth aspect of the present invention, the screen display data can be constructed of a plurality of partial screen display data obtained by dividing the screen, thereby reducing the data amount to be transferred.

According to a sixth aspect of the present invention, further to the fifth aspect, when the screen display data of the device is changed, the device transmits changed partial screen display data of the screen display data to the controller. Further, the controller receives the changed partial screen display data from the device through the transmission path and, based on the received partial screen display data, updates the operating screen displayed on the display means.

According to the sixth aspect of the present invention, when the screen display data of the device is changed because the state in the device is changed, for example, only the partial screen display data including the changed display element is sent to the controller. Therefore, the data amount to be transferred to the controller on change of screen display is reduced, and the processing in the device and controller is simplified.

According to a seventh aspect of the present invention, further to the fifth aspect, the device has partial screen identification information for identifying the partial screen display data, and transmits the partial screen display data and the partial screen identification information to the controller through the transmission path. The controller receives the partial screen display data and the partial screen identification information from the device through the transmission path.

According to an eighth aspect of the present invention, further to the seventh aspect, when the screen display data of the device is changed, the device transmits changed partial screen display data of the screen display data and the partial screen identification information of the partial screen display data to the controller. Further, the controller receives the changed partial screen display data and the partial screen identification information of the partial screen display data from the device through the transmission path and, based on the received partial screen display data and partial screen identification information, updates the operating screen displayed on the display means.

According to the eighth aspect of the present invention, when the screen display data of the device is changed, not only the partial screen display data including the change display element but also its partial screen identification information is sent to the controller. Therefore, the controller can easily specify the changed partial screen display data, thereby reducing a processing load such as updating the display of the operating screen on change of the screen display data.

According to a ninth aspect of the present invention, further to the seventh aspect, in response to an operation by a user to the operating screen, the controller controls the device by transmitting operation information indicative of the operation and the partial screen identification information corresponding to the operation to the device through the transmission path.

According to the ninth aspect of the present invention, in response to an operation from the user, the operation information and the partial screen identification information corresponding to the operation are transmitted to the device. Therefore the device can easily and reliably recognize to which partial screen display data the operation information transmitted to the device is directed, thereby preventing erroneous operation of the device.

According to a tenth aspect of the present invention, further to the seventh or ninth aspect, the partial screen identification information includes version information indicating a version of the partial screen display data.

According to the tenth aspect of the present invention, the partial screen identification information, which is sent to the controller together with the partial screen display data when the screen display data of the device is changed, includes version information. Therefore, the controller can prevent erroneous display of the operating screen by using this version information. Furthermore, in response to an operation from the user, the version information of the partial screen display data corresponding to the operation is sent to the device together with the operation information. Therefore, the device can easily and reliably know the operation by the user, thereby executing the operation as the user desires.

According to an eleventh aspect of the present invention, further to the seventh or ninth aspect, one display element in screen display is arranged in any one of a plurality of display parts corresponding to the plurality of partial screen display data.

According to the eleventh aspect of the present invention, if any one of the display elements on the operating screen is changed, only the partial screen display data of that display element is sent from the device to the controller, and the plurality of partial screen display data do not have to be sent. Therefore, the data amount to be transferred to the controller on change of screen display is reduced, and also the processing in the device and controller is simplified.

According to a twelfth aspect of the present invention, further to the seventh or ninth aspect, a display element corresponding to each operation by the user is arranged in any one of a plurality of display parts corresponding to the plurality of partial screen display data.

According to the twelfth aspect of the present invention, the display element corresponding to each operation by the user is arranged in any one of the plurality of display parts corresponding to the plurality of partial screen display data. Therefore, when, in response to the operation from the user, the operation information and the partial screen identification information corresponding to that operation are sent to the device, the device can easily recognize the user operation from the partial screen identification information.

A thirteenth aspect of the present invention is directed to a network control system in which a first unit and a second unit are connected to each other a transmission path and a controller included in the first unit controls a device in the second unit through the transmission path. At least one of the first unit and the second unit handle at least one of video, audio, and information. The device has screen display data for displaying an operating screen of the device and overlap display data for overlap display on the operating screen and transmits the screen display data and the overlap display data to the controller through the transmission path. The controller comprises a user interface including display means, receives the screen display data and the overlap display data from the device through the transmission path, and displays the operating screen on the display means using the screen display data, and carries out overlap display on the operating screen displayed on the display means by using the overlap display data. In response to an operation by a user to the operating screen, the controller controls the device by transmitting operation information indicative of the operation to the device through the transmission path.

According to a fourteenth aspect of the present invention, further to the thirteenth aspect, the overlap display data is cursor information for displaying a cursor indicative of a position of operation by the user to said operating screen.

According to a fifteenth aspect of the present invention, further to the fourteenth aspect, the cursor information includes position information indicative of a position of the cursor on the operating screen.

According to a sixteenth aspect of the present invention, further to the fourteenth aspect, the cursor information includes shape information indicative of a shape of the cursor.

According to the sixteenth aspect of the present invention, with cursor shape information being set, it is possible to conform the design of the cursor to the design of each display element on the operating screen.

According to a seventeenth aspect of the present invention, further to the fourteenth aspect, the cursor information includes size information indicative of a size of the cursor.

According to the seventeenth aspect of the present invention, with cursor size information being set, it is possible to conform the size of the cursor to the size of each display element on the operating screen.

According to an eighteenth aspect of the present invention, further to the fourteenth aspect, the cursor information includes color information indicative of a color of the cursor.

According to the eighteenth aspect of the present invention, with cursor color information being set, it is possible to conform the design of the cursor to the design of each display element on the operating screen. Furthermore, according to the eighteenth aspect, the GUI can be represented as supposed in the device, and thereby a GUI creator can easily convey his/her intention to users.

According to a nineteenth aspect of the present invention, further to the fourteenth aspect, the cursor information includes enable information indicating an operation that the user is allowed to perform.

According to the nineteenth aspect of the present invention, when an operator carries out operation, whether the operation is allowed is determined using enable information in the cursor information. Therefore, if the prohibited operation is instructed, operation information is not transmitted to the device, and error handling can be made in the controller.

According to a twentieth aspect of the present invention, further to the thirteenth aspect, when a display part corresponding to the overlap display data of the device is changed, the device transmits the overlap display data to the controller, and the controller receives the overlap display data from the device through the transmission path and, based on the received overlap display data updates the operating screen displayed on the display means.

According to the twentieth aspect of the present invention, if only the overlap display data is changed due to an operation from the user, the device that has received the operation information indicative of that operation sends overlap display data to the controller, but does not send the screen display data thereto. Using the received overlap display data, the controller updates overlap display on the operating screen. Therefore, when the cursor is displayed using the overlap display data, for example, the data amount to be transferred is small, thereby improving a response speed to cursor move operation.

A twenty-first aspect of the present invention is directed to a network control system in which a first unit and a second unit are connected to each other a transmission path and a controller included in the first unit controls a device in the second unit through the transmission path. At least one of the first unit and the second unit handle at least one of video, audio, and information. The device has screen display data for displaying an operating screen of the device and identification information for identifying the screen display data and transmits the screen display data and the identification information to the controller through the transmission path. The controller comprises a user interface including display means, receives the screen display data and the identification information from the device through the transmission path, and displays the operating screen on the display means using the screen display data.

A twenty-second aspect of the present invention is directed to a network control system in which a first unit and a second unit are connected to each other a transmission path and a controller included in the first unit controls a device in the second unit through the transmission path. At least one of the first unit and the second unit handle at least one of video, audio, and information. The device has screen display data for displaying an operating screen of the device and identification information for identifying the screen display data and transmits the screen display data and the identification information to the controller through the transmission path. The controller comprises a user interface including display means, receives the screen display data and the identification information from the device through the transmission path, and displays the operating screen on the display means using the screen display data and the identification information.

A twenty-third aspect of the present invention is directed to a network control system in which a first unit and a second unit are connected to each other a transmission path and a controller included in the first unit controls a device in the second unit through the transmission path. At least one of the first unit and the second unit handles at least one of video, audio, and information. The device has screen display data for displaying an operating screen of the device and overlap display data for overlap display on the operating screen and transmits the screen display data and the overlap display data to the controller through the transmission path. The controller comprises a user interface including display means, receives the screen display data and the overlap display data from the device through the transmission path, and displays the operating screen on the display means using the screen display data, and carries out overlap display on the operating screen displayed on the display means by using the overlap display data.

A twenty-fourth aspect of the present invention is directed to a second unit that is connected to each other a transmission path to a first unit including a controller and includes a device controlled by the controller through the transmission path. At least one of the first unit and the second unit handles at least one of video, audio, and information. The device has screen display data for displaying an operating screen of the device and identification information for identifying the screen display data, transmits the screen display data and the identification information to the controller through the transmission path, and receives the identification information of the screen display data and operation information indicative of an operation by a user, and operates based on the received identification information and operation information.

A twenty-fifth aspect of the present invention is directed to a first unit that is connected to each other a transmission path to a second unit and includes a controller for controlling a device included in the second unit through the transmission path. At least one of the first unit and the second unit handles at least one of video, audio, and information. The controller comprises a user interface including display means, receives screen display data indicative of an operating screen of the device and identification information for identifying the screen display data from the device through the transmission path, and displays the operating screen on the display means using the screen display data. In response to an operation by a user to the operating screen, the controller controls the device by transmitting operation information indicative of the operation and the identification information to the device through the transmission path.

According to a twenty-sixth aspect of the present invention, further to the twenty-fourth aspect, the operation information includes operating position information indicative of a position of operation on the operating screen.

According to a twenty-seventh aspect of the present invention, further to the twenty-fifth aspect, the operation information includes operating position information indicative of a position of operation on the operating screen.

A twenty-eighth aspect of the present invention is directed to a second unit that is connected to each other a transmission path to a first unit including a controller and includes a device controlled by the controller through the transmission path. At least one of the first unit and the second unit handles at least one of video, audio, and information. The device has screen display data composed of a plurality of partial screen display data for displaying an operating screen of the device, transmits the partial screen display data to the controller through the transmission path, and receives operation information indicative of an operation by a user, and operates based on the received operation information.

A twenty-ninth aspect of the present invention is directed to a first unit that is connected to each other a transmission path to a second unit and includes a controller for controlling a device included in the second unit through the transmission path. At least one of the first unit and the second unit handles at least one of video, audio, and information. The controller comprises a user interface including display means, receives a plurality of partial screen display data indicative of an operating screen of the device through the transmission path from the device, and displays the operating screen on the display means using the partial screen display data. In response to an operation by a user to the operating screen, the controller controls the device by transmitting operation information indicative of the operation through the transmission path to the device.

According to a thirtieth aspect of the present invention, further to the twenty-eighth aspect, when the screen display data of the device is changed, the device transmits changed partial screen display data of the screen display data to the controller.

According to a thirty-first aspect of the present invention, further to the twenty-ninth aspect, when the screen display data of the device is changed, the controller receives changed partial screen display data of the screen display data from the device through the transmission path and, based on the received partial screen display data, updates the operating screen displayed on the display means.

A thirty-second aspect of the present invention is directed to a second unit that is connected to a transmission path to a first unit including a controller and includes a device controlled by the controller through the transmission path. At least one of the first unit and the second unit handles at least one of video, audio, and information. The device has screen display data for displaying an operating screen of the device and overlap display data for overlap display on the operating screen, transmits the screen display data and the overlap display data to the controller through the transmission path, and receives operation information indicating a user's operation transmitted from the controller, and operates based on the received operation information.

A thirty-third aspect of the present invention is directed to a first unit that is connected through a transmission path to a second unit and includes a controller for controlling a device included in the second unit through the transmission path. At least one of the first unit and the second unit handles at least one of video, audio, and information. The controller comprises a user interface including display means, receives screen display data indicative of an operating screen of the device and overlap display data for overlap display on the operating screen through the transmission path, and displays the operating screen of the device on the display means using the screen display data, and performing overlap display on the operating screen displayed on the display means using the overlap display data. In response to an operation by a user to the operating screen, the controller controls the device by transmitting operation information indicating the operation through the transmission path to the device.

A thirty-fourth aspect of the present invention is directed to a control method, in a network control system in which a first unit and a second unit are connected to each other a transmission path, at least one of the first unit and the second unit being for handling at least one of video, audio, and information, and a controller included in the first unit controlling a device included in the second unit through the transmission path. The control method comprising the steps of: transmitting screen display data for displaying an operating screen of the device and identification information for identifying the screen display data from the device through the transmission path to the controller; displaying the operating screen on the controller using the screen display data transmitted from the device; and in response to an operation by a user to the operating screen, controlling the device by transmitting operation information indicative of the operation and the identification information from the controller through the transmission path to the device.

A thirty-fifth aspect of the present invention is directed to a control method, in a network control system in which a first unit and a second unit are connected to each other a transmission path, at least one of the first unit and the second unit being for handling at least one of video, audio, and information, and a controller included in the first unit controlling a device included in the second unit through the transmission path. The control method comprising the steps of: transmitting screen display data for displaying an operating screen of the device and identification information for identifying the screen display data from the device through the transmission path to the controller; displaying the operating screen on the controller using the screen display data and the identification information transmitted from the device; and in response to an operation by a user to the operating screen, controlling the device by transmitting operation information indicative of the operation and the identification information from the controller through the transmission path to the device.

A thirty-sixth aspect of the present invention is directed to a control method, in a network control system in which a first unit and a second unit are connected to each other a transmission path, at least one of the first unit and the second unit being for handling at least one of video, audio, and information, and a controller included in the first unit controlling a device included in the second unit through the transmission path. The control method comprising the steps of: transmitting at least one of plurality of partial screen display data composing screen display data for displaying an operating screen of the device from the device through the transmission path to the controller; displaying the operating screen on the controller using the partial screen display data transmitted from the device; and in response to an operation by a user to the operating screen, controlling the device by transmitting operation information indicative of the operation from the controller through the transmission path to the device.

A thirty-seventh aspect of the present invention is directed to a control method, in a network control system in which a first unit and a second unit are connected to each other a transmission path, at least one of the first unit and the second unit being for handling at least one of video, audio, and information, and a controller included in the first unit controlling a device included in the second unit through the transmission path. The control method comprising the steps of: transmitting screen display data for displaying an operating screen of the device and overlap display data for overlap display on the operating screen from the device through the transmission path to the controller: displaying the operating screen on the controller and performing overlap display on the displayed operating screen based on the overlap display data by using the screen display data and the overlap display data transmitted from the device; and in response to an operation by a user to the operating screen, controlling the device by transmitting operation information indicative of the operation from the controller through the transmission path to the device.

A thirty-eighth aspect of the present invention is directed to a control method, in a network control system in which a first unit and a second unit are connected to each other a transmission path, at least one of the first unit and the second unit being for handling at least one of video, audio, and information, and a controller included in the first unit controlling a device included in the second unit through the transmission path. The control method comprising the steps of: transmitting screen display data for displaying an operating screen of the device and identification information for identifying the screen display data from the device through the transmission path to the controller; and displaying the operating screen on the controller using the screen display data transmitted from the device.

A thirty-ninth aspect of the present invention is directed to a control method, in a network control system in which a first unit and a second unit are connected to each other a transmission path, at least one of the first unit and the second unit being for handling at least one of video, audio, and information, and a controller included in the first unit controlling a device included in the second unit through the transmission path. The control method comprising the steps of: transmitting screen display data for displaying an operating screen of the device and identification information for identifying the screen display data from the device through the transmission path to the controller; and displaying the operating screen on the controller using the screen display data and the identification information transmitted from the device.

A fortieth aspect of the present invention is directed to a control method, in a network control system in which a first unit and a second unit are connected to each other a transmission path, at least one of the first unit and the second unit being for handling at least one of video, audio, and information, and a controller included in the first unit controlling a device included in the second unit through the transmission path. The control method comprising the steps of: transmitting screen display data for displaying an operating screen of the device and overlap display data for overlap display on the operating screen from the device through the transmission path to the controller; and displaying the operating screen on the controller and performing overlap display on the operating screen based on the overlap display data by using the screen display data and the overlap display data transmitted from the device.

BRIEF DESCRIPTION OF THE DRAWINGS

FIG. 5 is a diagram illustrating one protocol of the network control system in the first embodiment.

FIG. 12 is a diagram illustrating version information in the second embodiment.

FIG. 13 is a diagram illustrating a protocol of a network control system in the second embodiment.

BEST MODE FOR CARRYING OUT THE INVENTION

The present invention is now described in more detail referring to the attached drawings.

<First Embodiment>

Figure 1:
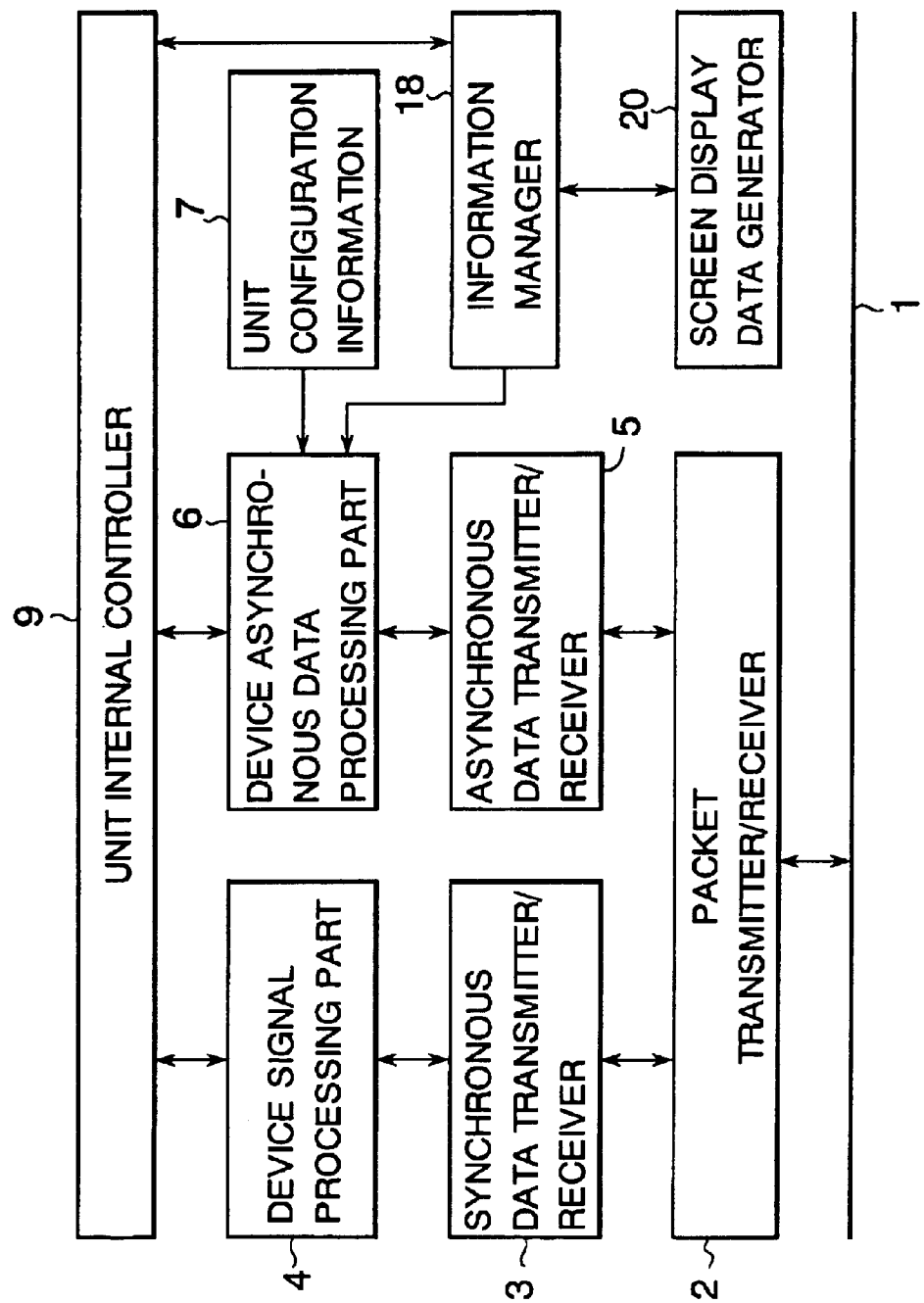
FIG. 1 is a block diagram showing the configuration of a device in a network control system according to a first embodiment of the present invention.
Figure 2:
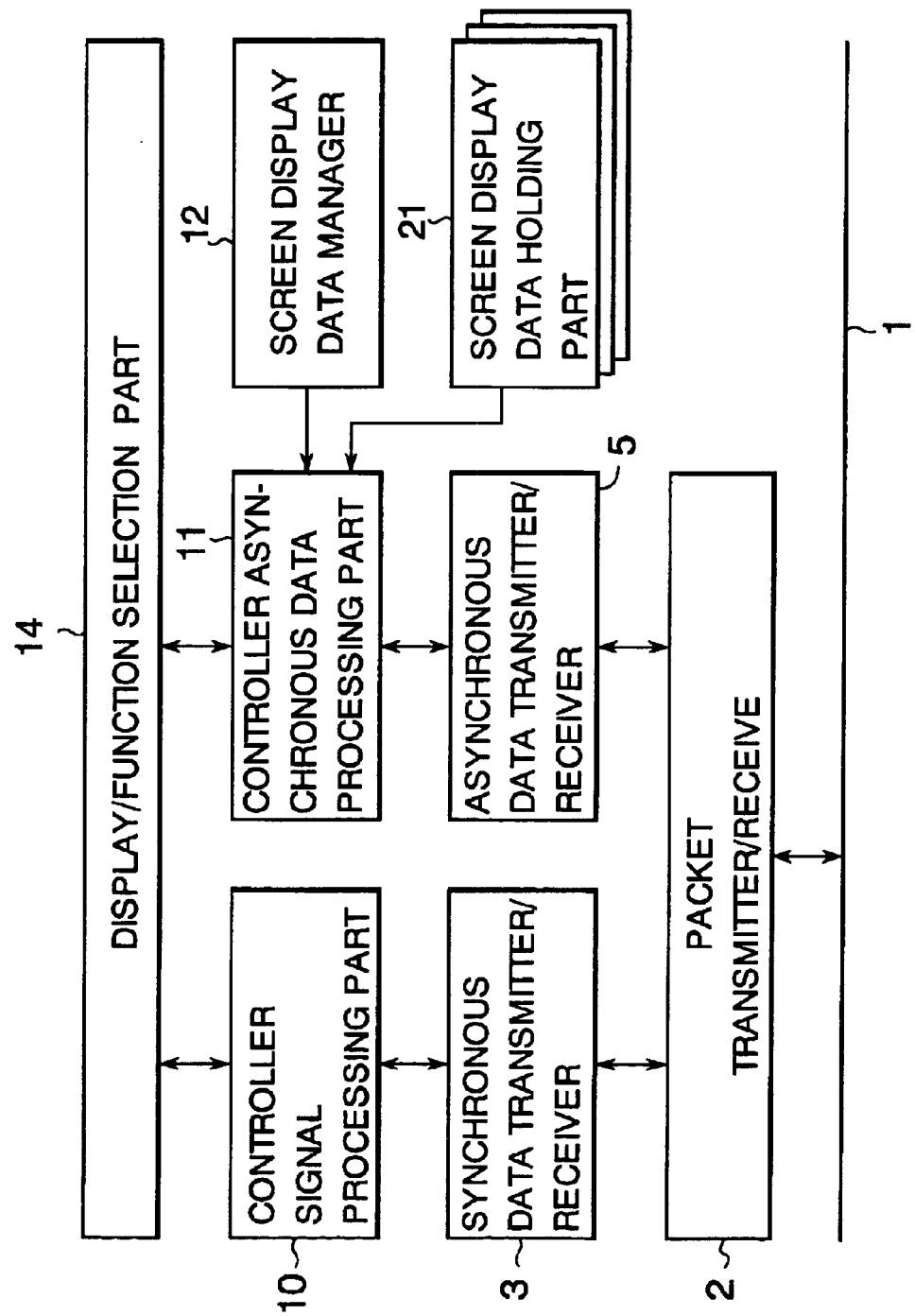
FIG. 2 is a block diagram showing the configuration of a controller in the network control system according to the first embodiment.

FIG. 1 is a block diagram showing the configuration of a device in a network control system according to a first embodiment of the present invention, and FIG. 2 is a block diagram showing the configuration of a controller in the network control system according to the first embodiment. The operation and configuration of the network system of the present embodiment are now described by using FIGS. 1 and 2.

A device described herein means something to be controlled by a controller. The controller herein means something that it has a user interface including display means such as a video monitor having a graphic display function and operating means such as a mouse, keyboard, and TV remote and controller that a user operates while watching the screen of the video monitor. Note that either one or both of the device and the controller may exist in a single unit. Further, the device corresponds to one node on a transmission path, and a unit may be constructed so as to have a plurality of nodes in a single box. The controller and the video monitor may be different units, and the connection therebetween is arbitrarily determined: they may be connected in an analog manner or with a transmission path as shown in the present embodiment.

<1.1 Device in the First Embodiment>

As shown in FIG. 1, the device in the network control system of the present embodiment includes a packet transmitter/receiver 2, a synchronous data transmitter/receiver 3, a device signal processing part 4, an asynchronous data transmitter/receiver 5, a device asynchronous data processing part 6, a unit configuration information 7, an information manager 18, and a screen display data generator 20. The packet transmitter/receiver 2 is connected to a transmission path 1.

The transmission path 1 is, by way of example only, a serial bus defined by IEEE 1394 standard (IEEE 1394-1995 and standards upward-compatible therewith) (1394 bus). Note that the transmission path 1 is not necessarily the 1394 bus, but is implemented by using ATM, Ethernet, infrared transmission, or the like.

The packet transmitter/receiver 2 physically and electrically interfaces with the transmission path 1, and also carries out arbitration of bus mastership, cycle control for synchronous transfer, and other processing. Further, the packet transmitter/receiver 2 selectively receives a packet on the transmission path 1 according to the destination and transmits the packet to the transmission path 1.

At transmission, the synchronous data transmitter/receiver 3 manages the transfer rate (data dividing) and provides a header. For example, when the 1394 bus of the AV protocol (IEC 61883) standard is used, the synchronous data transmitter/receiver 3 provides a CIP (Common Isochronous Packet) header. On the other hand, when receiving data, the synchronous data transmitter/receiver 3 rearranges received packets in a correct order, removes the headers, and performs other processing.

The device signal processing part 4 receives synchronous data from the synchronous data transmitter/receiver 3 to carry out signal processing according to the device. For example, if the device is a recorder/player such as a digital VCR, the device signal processing part 4 records the synchronous data into a recording medium (magnetic tape, for example). In addition, the device signal processing part 4 retrieves the synchronous data from the recording medium, broadcasting wave, etc., and transmits the same to the synchronous data transmitter/receiver 3.

The asynchronous data transmitter/receiver 5 carries out asynchronous data transactions according to the protocol of the transmission path 1. By way of example, for the 1394 bus, read, write, lock transactions are performed. Here, the asynchronous data transmitter/receiver 5 may be implemented as software.

The device asynchronous data processing part 6 processes the asynchronous data received from the asynchronous data transmitter/receiver 5, and then transfers the same to the appropriate component in the device. For example, if receiving a control data and user operation information as the asynchronous data, the device asynchronous data processing part 6 determines validity of the asynchronous data, and instructs a unit internal controller 9 to execute functions corresponding to the control code and user operation information if the data is valid. Here, the device asynchronous data processing part 6 may transfer the control code and the user operation information to the information manager 18. In this case, the information manager 18 determines validity of these and, if valid, instructs the unit internal controller 9 to execute functions indicated by these.

If the controller requests for the unit configuration information 7, the device asynchronous data processing part 6 sends, according to the request received through the asynchronous data transmitter/receiver 5, etc., the information in the unit configuration information 7 through the asynchronous data transmitter/receiver 5, etc., to the controller. Furthermore, based on the instruction from the unit internal controller 9, the device asynchronous data processing part 6 sends asynchronous data from the components in the device to the asynchronous data transmitter/receiver 5. Here, the asynchronous data transmitter/receiver 5 and the device asynchronous data processing part 6 may be constructed as a single unit.

The unit configuration information 7 indicates information about the configuration of the device, being written according to the rule shown by a configuration ROM of a CSR (Command and Status Registers) architecture indicated by ISO/IEC 13213:1994. If the 1394 bus is used, the device configuration information includes bus information such as whether the device supports a bus manager and isochronous operation, unit directory including information whether the device supports an AV protocol and a unique ID as an identifier of the device.

When transmitting bitmap data indicative of contents to be displayed on the screen of the display means of the controller as a device operating screen (hereinafter referred to as "screen display data") to the controller, the information manager 18 provides the screen display data with identification information for identifying the screen display data. Further, the information manager 18 instructs the screen display data generator 20 to update the screen display data according to the instruction from the unit internal controller 9.

This identification information includes information for specifying the device (unique ID to the device, for example) and version information. By way of example, when the identification information includes version information, the information manager 18 is constructed using a counter to manage the version of the screen display data. The counter in the information manager 18 is incremented every time the screen information is updated by the unit internal controller 9. Here, the counter is an infinite cyclic counter having a sufficient finite bit length, and indicates a minimum value after its maximum value is incremented. The bit length of the counter is arbitrarily determined. Preferably, however, the bit length is sufficient enough to prevent one cycle of the counter value from being complete at least while the controller holds control or has access to a change of state in order to avoid the same counter value from indicating different screen display data.

Further, when the screen display data is read to the controller, the counter value is also read thereto. The counter value indicates the version information of the read screen display data. Thus, the controller can confirm the version information, thereby improving reliability.

The screen display data generator 20 generates screen display data (screen display data in a bitmap format, for example) indicating the operating screen for the device according to the instruction from the unit internal controller 9 based on the state of the device and user operation. Here, the screen display data generated by the screen display data generator 20 is screen display data displayed on one screen of the controller. The size of the operating screen is predetermined through the communication between the device and the controller, standards, or the like, or written in the header of the screen information, etc. On the operating screen displayed using the screen display data, control information for controlling the device, contents information, operating state information, etc., are displayed.

Here, the control information indicates an operating panel (reverse button, stop button, record button, etc.,) of a VCR, for example. The contents information indicates information for notifying the user of the contents. For an STB (set-top box), the contents information indicates information about a program now being broadcast, that is, a program title, title image, theme music, summary, cast, etc. For a DVD device, the contents information indicates the contents recorded on a disk as a recording medium, that is, a title, title image, theme music, summary, cast, etc. For the VCR, by way of example only, the operating state information indicates a display element (also called "object") such as display elements indicating the state of operation of the device (playing, reversing, unattended recording programmed). Further, information required for network control such as identification information of the controller that is now using the device, and time, data, and a channel number for unattended recording, etc., may be written in the operating state information.

The unit internal controller 9 controls each components including the internal mechanism of the device; etc. If the device asynchronous data processing part 6 receives a control code indicating an operation of the device, the unit internal controller 9 causes the device to operate according to the control code as instructed by the device asynchronous data processing part 6. Also, according to a change of state in the device and the user operation, the unit internal controller 9 instructs the screen display data generator 20 to update the screen display data through the information manager 18.

The operation of the device in response to the request from the controller, etc., is as follows. If the device or controller is connected to the transmission path 1, the controller first reads the unit configuration information 7 of the device to determine whether the device has screen display data or not, making a request to the device for GUI information and reading the screen display data from the screen display data generator 20.

Then, if receiving the user operation information from the controller, the device carries out processing indicated by the operation information according to the circumstances.

Here, for example, when the controller transmits operating information indicating that the user performs "select" operation (hereinafter referred to as "operation information "select"") while displaying the operating screen for the device using the screen display data, the asynchronous data transmitter/receiver 5 reports the operation to the unit internal controller 9. The unit internal controller 9 provide an instruction to each component in the device according to the state of the screen display data. By way of example, assume that screen display data indicating that the cursor is displayed on the play button is transmitted from the device to the controller and the user performs "select" operation while the controller displays the screen display data. In this case, the device receives the user operation information "select", and the unit internal controller 9 recognizes, from the screen display data or the state of the device that has generated the screen display data, that the user operation indicates "play", and provides an instruction to each components in the device to start the play operation.

Note that, at this time, in addition to the user operation information, the identification information of the screen display data being displayed by the controller when the user performed operation is transmitted to the device. Therefore, the device can correctly determine to which screen display data the user operation is directed. Such determination can be easily made even if the user operation becomes invalid or indicates control of another function due to a change of state in the device (for example, when the screen display data is totally changed). Thus erroneous operation of the device can be prevented. As such, if the user operation becomes invalid due to a change of information in the device, the device can update the screen display data and notify the user that the operation becomes invalid.

As described above, in response to the request from the controller for GUI (Graphical User Interface) information, all the device has to do is to provide the screen display data information, thereby lightening the load on the device. Further, it is not necessary to define a command to each function of the device by standardization organizations etc, Even for a device having a new function that cannot be presently assumed, if screen display data compliant with the new function is sent to the controller, the new function can be easily presented to the user via the transmission path 1, and become available to the user. Then, by specifying the function of the device using the user operation information and the screen display data, the user can control the device with a simple structure.

Note that the component such as the synchronous data transmitter/receiver 3 and the device signal processing part 4 may be arbitrarily implemented according to the function of the device, and may be omitted. Furthermore, such component may be implemented as either hardware or software.

Further, the user operation information may be encoded and then sent. Moreover, the screen information and the user operation information are not required to be sent or received through the same transmission path. By way of example, the screen information is transmitted through a 1394 bus using a cable while the operation information by infrared rays.

<1.2 The Controller in the First Embodiment>

FIG. 2 is a block diagram showing the configuration of the controller in the network control system of the present embodiment. The controller includes a controller signal processing part 10, a controller asynchronous data processing part 11, a screen display data manager 12, a display/function selection part 14, and a screen display data holding part 21. Note that, in FIG. 2, the same components as those shown in FIG. 1 are provided with the same reference numerals, and their description is omitted herein.

The controller signal processing part 10 receives synchronous data from the synchronous data transmitter/receiver 3, and carries out signal processing that is capable of being performed by the controller. By way of example, if the controller is capable of displaying video such as a video monitor, the controller signal processing part 10 decodes the synchronous data (MPEG2 stream, for example) for display on the screen.

The controller asynchronous data processing part 11 processes asynchronous data received from the asynchronous data transmitter/receiver 5, and then transmits the processed data to each appropriate component in the controller.

Furthermore, the controller asynchronous data processing part 11 receives, from the packet transmitter/receiver 2 through the asynchronous data transmitter/receiver 5, information about the device on the transmission path 1 such as connection of a new device and removal of an existing device, and screen display data of the device, and then transmits them to the screen display data manager 12. Further, according to the instruction from the display/function selection part 14, the controller asynchronous data processing part 11 sends asynchronous data from each component in the controller to the asynchronous data transmitter/receiver 5. Here, the asynchronous data transmitter/receiver 5 and the controller asynchronous data processing part 11 may be constructed as a single unit.

Assume the controller and the device are constructed in a single unit. Since the screen display data of the device in the unit is generated in the unit internal controller 9, the unit has the screen display data of the device but the screen display data manager 12 is does not necessarily required to manage it. Also, in this case, the controller signal processing part 10 and the device signal processing part 4, and the controller asynchronous data processing part 11 and the device asynchronous data processing part 6 may be constructed as a single unit, respectively.

The screen display data manager 12 manages screen display data information received from the device on the transmission path 1. When receiving, from the controller asynchronous data processing part 11, information about new device connection, the screen display data manager 12 instructs the controller asynchronous data processing part 11 to read screen display data information of the new device. Note that, in this case, the new device may search for the controller to spontaneously transmit its screen display data to the controller.

Next, when the screen display data and its version information of the new device has been read, the screen display data is held in the screen display data holding part 21, and its identification information is stored in the screen display data manager 12 in relation to the screen display data. Here, the identification information includes the read version information. The identification information may be stored in the screen display data holding part 21 together with the screen display data, or may be stored and managed by the screen display data manager 12. Furthermore, when, for example, information about removal of an existing device on the transmission path 1 is received, the corresponding screen display data is deleted from the screen display data holding part 21. Note that the screen display data in the controller does not have to be exactly the same in format as that in the device as long as they include the same information.

The display/function selection part 14 notifies the user of the screen display data including a display element (video/audio/character information, etc.,) indicating a function or state of the device on the screen of the controller and, according to user operation, selects a device and function, and provides instructions of executing each function. This display/function selection part 14 instructs the screen display data manager 12 to search for the screen display data and, using the screen display data obtained through search, causes the operating screen for an arbitrarily device on the transmission path 1 to be displayed on the screen of the controller. Further, the display/function selection part 14 can display/replay data received from the controller signal processing part 10 (video and audio data, for example) and data received from the controller asynchronous data processing part 11. At this time, the screen display data may be overlaid on the video data received from the controller signal processing part 10, or the display screens for the screen display data and for the video data may be switched according to a user's instruction, etc. Further, the background of the screen display data may be transparent to allow display of the video data.

If the user performs, onto the screen displayed by the controller, operation such as pressing a selection button on the remote controller and pressing a right-direction arrow button, the display/function selection part 14 issues the identification information of the screen display data and operation information indicative of this user operation through the controller asynchronous data processing part 11, etc.

The display/function selection part 14 receives, as updated screen display data, a response from the device to the identification information and the user operation information through the controller asynchronous data processing part 11. The identification information is managed by the screen display data manager 12, and the corresponding screen display data in the screen display data holding part 21 is updated. Further, if the identification information added to the screen display data as the response includes version information, the screen display data manager 12 checks the version information, and updates the screen display data held in the screen display data holding part 21 only when the version information has been correctly updated. Thus, the screen display data held in the controller does not have to be updated every time the same screen display data is transmitted, thereby lightening a load.

In the present embodiment, the controller does not have to recognize each function of the device. For example, even for a device having a new function that cannot be presently assumed, the controller can notify the user by displaying screen display data including a display element (button, for example) to the new function. When, with such display element, the user understands and selects the new function, the display/function selection part 14 of the controller transmits this user operation information to the device to cause the device to execute the new function. Therefore, with the above structure, the user can execute even a new function that cannot be presently assumed.

Note that the components such as the synchronous data transmitter/receiver 3 and the controller signal processing part 10 may be omitted according to the function of the controller.

<1.3 System Structure in the First Embodiment>

Figure 3:
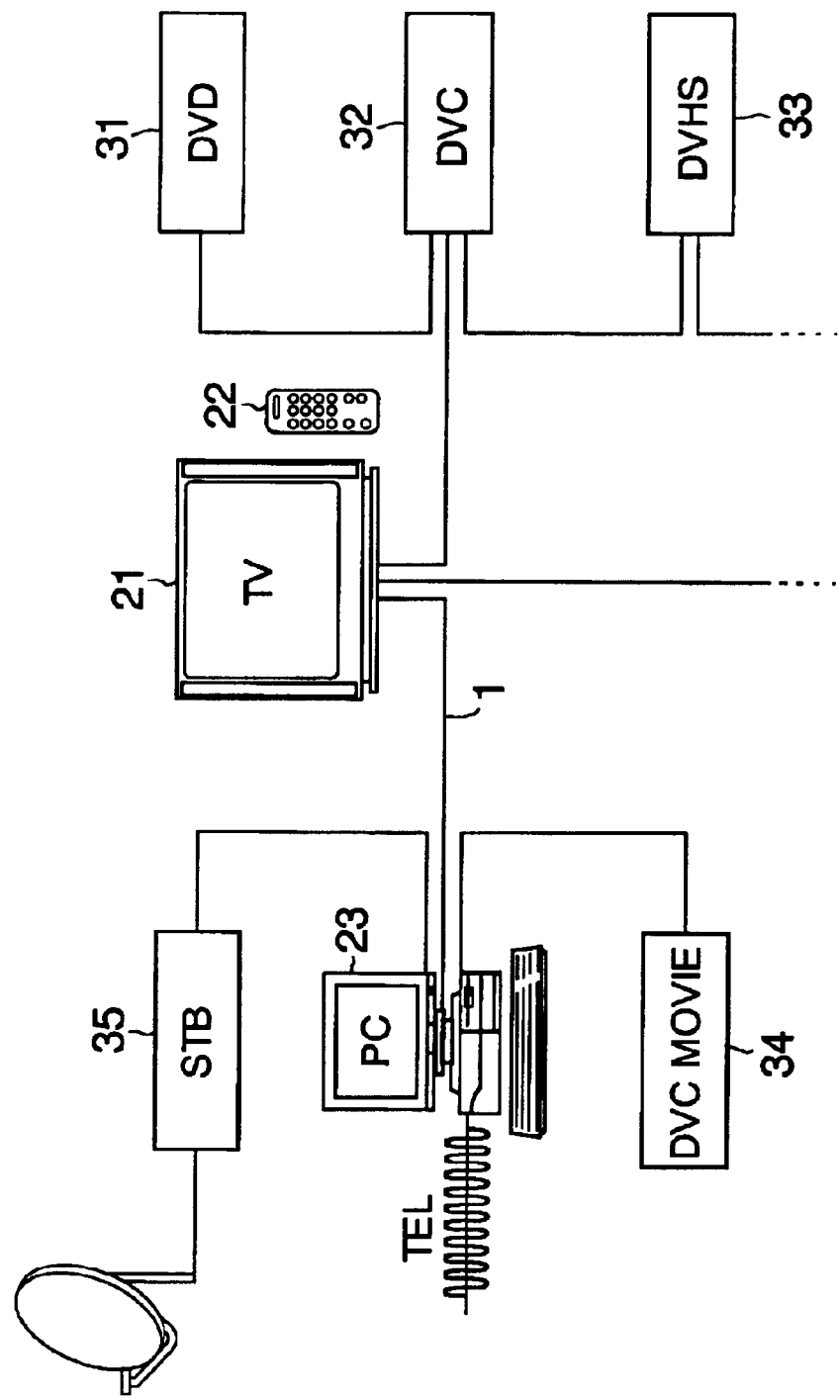
FIG. 3 is a diagram showing one example of system configuration of the network control system in the first embodiment.

FIG. 3 is a diagram showing the system structure of the network control system of the present embodiment. As shown in FIG. 3, the network control system includes a television receiver (television) 21, a television remote controller 22, a personal computer (PC) 23, a recordable/replayable DVD 31, a DV-format digital VCR (DVC) 32, a VHS-format digital VCR (DVHS) 33, a DV-format digital movie (DVC movie) 34, and a set-top box (STB) for CS digital broadcasting 35, which are collectively called video/audio/information devices.

These video/audio/information devices are connected to the transmission path 1 to form a single network control system (such system is called "AVC system".) Note that the video/audio/information devices are not restricted to the above mentioned devices, but include all of existing devices in video, audio, and information areas (printer and mini-disc, for example) and devices coming in the future.

In such system of the present embodiment, the television 21 is a unit composed of a controller and a device, and the user uses the remote controller 22 to provide instructions to the display/function selection part 14. The PC 23 is a unit composed of a controller and a device (modem that interfaces with a telephone line, video monitor, etc.,) and the user uses a keyboard, mouse, etc. to provide instructions to the display/function selection part 14.

Here, the DVD 31 and the DVC movie 34 are units capable of recording and replaying audio and video data (hereinafter referred to "AV data"). Each of the DVC 32 and the DVHS 33 is a unit composed of a device capable of recording and replaying AV data and a device having a function as a digital broadcasting tuner. The STB 35 is a device having a function as a tuner for receiving CS digital broadcasting.

Here, the DVD 31, DVC 32, DVHS 33, DVC movie 34, and STB 35 are all devices. However, each of these units may be implemented as a unit including a controller and a device as long as such unit can realize, if small at all, an environment enabling the user to operate other devices through a liquid crystal panel, etc., that is, for example, as long as the unit enables the user to carry out operation such as selecting functions of other devices with a touch panel, remote controller, etc. Each of these units may include a processing function as a controller with its remote controller. In such case, only display and audio may be displayed on a monitor through analog connection, etc., and the user may operate the unit through the remote controller while watching the displayed screen. At this time, the unit may include a controller and a device.

<1.4 Screen Display Data in the First Embodiment>

FIGS. 4(*a*) to (*c*) are diagrams showing the structure of screen display information to be transmitted from the device to the controller in the present embodiment. FIG. 4(*a*) shows screen information using an ID as the identification information; FIG. 4(*b*) shows screen information whose identification information includes version information; and FIG. 4(*c*) shows screen information using version information as the identification information.

First, the screen information shown in FIG. 4(*a*) has an identifier (ID) for identifying each screen display data. As such, by identifying the screen display data with the identifier, the device can easily and reliably recognize to which screen display data the user operation information from the controller to the device is directed, thereby preventing erroneous operation of the device.

The screen information shown in FIG. 4(*b*) has, as the identification information, an identifier (ID) for identifying each screen display data and version information. For example, if the device is a VCR and each of a deck part and a tuner part has a different operating screen, the device can be constructed as such that each operating screen is provided with an identifier, and version information according to changes in each operating screen. In this way, if the screen display data is identified by the identifier and the version information, the device can manage by classification and reliably recognize to which screen display data the user operation information from the controller to the device is directed, thereby preventing erroneous operation of the device. Furthermore, the device can easily manage the screen display data. Still further, even if the device resent the same screen display data due to problems in the transmission path, etc., the controller can easily know the fact and does not have to carry out unnecessary screen update, thereby reducing the processing.

The screen information shown in FIG. 4(*c*) does not have an identifier (ID) for identifying each screen display data, but uses version information instead as the identification information. As such, by using a value which sequentially changes according to the changes of the screen display data as the identification information, the controller and the device can easily determine to which screen display data the user operation information from the controller to the device is directed. The device can thus easily know which screen display data the controller is now displaying and how much difference there is between the screen on the controller and the screen display data of the device. Further, if the screen display data transmitted from the device is missing or required to be resent due to problems on the transmission path, etc., the controller can easily know the fact of missing or a retransmission cycle to change the processing according to the degree of missing or control the screen display in consideration of the retransmission cycle, thereby providing a more usable display screen to the user.

Note that the screen information may include in its header part type information indicating a type of the screen display data (for example, a format of the bitmap data), attribute information indicating whether the screen display data is split screen display data, or has version information, size information indicating the size of the screen display data, and the like.

Figure 4A:
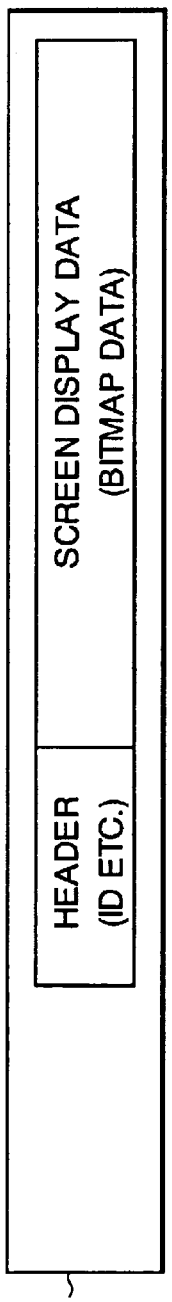
FIGS. 4A–4C are diagrams showing the structure of screen information sent from a device to a controller in the first embodiment.
Figure 4B:
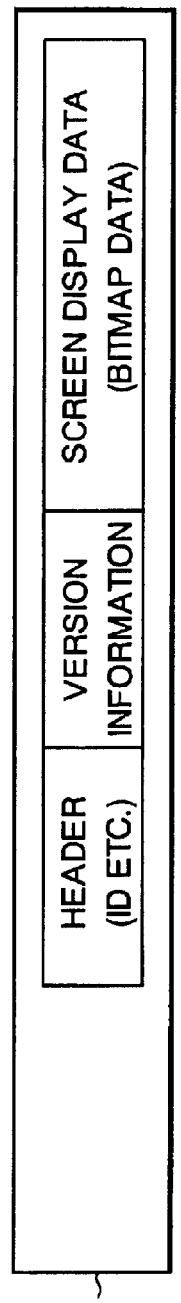
Figure 4C:
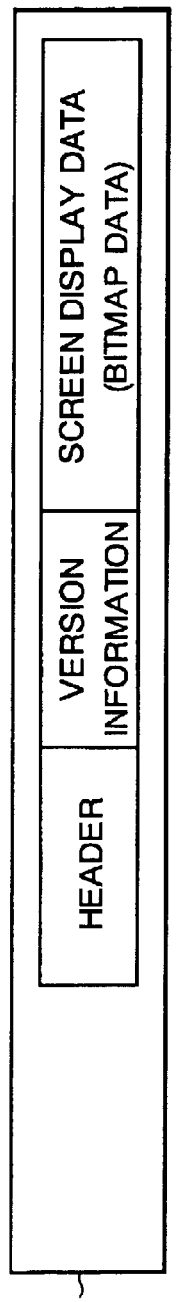

Further, the physical/logical structure of the screen information which was read into the controller does not have to be in the same in format as that in the device as long as information that is valid for the screen display included in the screen information in the controller is the same as that in the device. In other words, the screen information does not have to physically include the header as shown in FIGS. 4(a) to (c), etc., as long as information such as header is managed by the controller.

<1.5 Control Operation in the First Embodiment>

FIG. 5 is a diagram illustrating one protocol of the network control system in the first embodiment. The operation for controlling the controller and the device is now described below using the drawing.

First, if a device 200 is newly connected to the transmission path I, a controller 100 on the transmission path 1 recognizes the new device 200 through bus reset if the bus is a 1394 bus, for example. On the instruction for the screen display data manager 12, the controller first issues a screen request 101 through the transmission path 1 to the device 200. Responding to the screen request 101, the device 200 sends the screen display data and its identification information as screen information 111, and the controller 100 then reads the screen information 111. Then, the screen display data manager 12 of the controller 100 reads and registers the screen display data to store it in the screen display data holding part 21 of the controller 100.

Here, the structure may be as such that, when the new device 200 is connected to the transmission path 1, the device 200 spontaneously transmits the screen display data to the controller 100. Alternatively, the structure may be as such that, when the new device 200 is connected to the transmission path 1, the controller 100 and the device 200 communicate with each other to determine a transmission method of the screen display data and the device 200 transmits the screen display data to the controller 100 by following the method.

The screen display data read into the controller 100 is identified by the unique ID for each device 200 and the identification information. For example, the screen display data has a list structure or directory structure with an entry for each device 200. Note that how the screen display data is held is arbitrarily determined.

The display/function selection part 14 of the controller 100 refers to the screen display data in the screen display data holding part 21 through the screen display data manager 12, and displays the same on the display screen. Here, if the user desires to display the operating screen for another device 200 that is connected to the controller 100, for example, the screen display data of the devices 200 that are connected to the controller 100 are sequentially displayed on the display screen by using a display switching button on the remote controller, and then the screen display data representing the operating screen for the desired device 200 is displayed.

Here, if the controller 100 displays the screen display data of a specific device 200, the display/function selection part 14 makes a request to the screen display data manager 12 for the screen display data of that device 200 using the unique ID of the device 200, etc. The screen display data manager 12 retrieves the screen display data of the device 200 from all screen display data in the screen display data holding part 21, and then transmits the same to the display/function selection part 14. The display/function selection part 14 causes the screen display data to be displayed on the display screen.

However, if the device 200 connected to the transmission path 1 is included in a device list of the display/function selection part 14 listing connected devices, but the screen display data of that device 200 is not in the screen display data holding part 21, the screen display data manager 12 sends the screen request 101 shown in FIG. 5 to the device 200 as a command. In response, the device 200 returns the screen information 111. The screen response 111 includes the screen display data indicative of the operating screen of the device 200, etc., and the identification information of this screen display data. The identification information includes the identifier (ID), the version information, etc. This version information indicates the version of the screen display data, and is updated every time the screen is updated.

Note that the device list is a list that is made in the display/function selection part 14 by searching the transmission path 1 according to change information about the devices 200 connected to the transmission path 1 (a bus reset signal, for example, for reporting addition/removal) and detecting the connected devices 200.

The device 200 may return only the identification information in the device 200 as the screen information 111. At this time, the controller 100 has to further read the screen display data body from the device 200. However, if the controller 100 has cached the screen display data, for example, in order to transmit the same screen as that previously transmitted, the device 200 does not have to send the screen display data body to the controller 100, thereby reducing data amount to be transmitted, lightening a load on the transmission path, and simplifying the processing in the controller 100 and the device 200.

In this way, the screen display data manager 12 reads the screen display data of the device 200 thereinto. Therefore, the display/function selection part 14 uses the screen display data manager 12 to read out the desired screen display data from the screen display data holding part in the controller 100, and causes the same to be displayed on the screen. Thus, the screen display data of the arbitrary device 200 can be displayed on the screen.

Next, if the user operates a button on the remote controller, etc., the display/function selection part 14 transmits the type of the operated button, the operation ("press", "release", "select", for example), and the identification information of the screen display data to the device 200. In other words, assuming that the remote controller has arrow keys indicating upward, downward, rightward, and leftward directions, if the user presses the rightward direction arrow key, for example, the controller 100 transmits to the device 200, as an operation request 241, operation information ("rightward arrow key" and "press") and the identification information of the screen display data obtained from the device to the device 200. Therefore, the device 200 can easily and reliably recognize to which operating screen the operation is directed, and therefor can execute correct operation. If the device 200 is a pointing device 200 such as a mouse is used for the operating screen displayed on the controller 100, the operating information transmitted to the device 200 includes information indicating the operating position of the mouse, etc (hereinafter referred to as "operating position information"). In this case, the device 200 recognizes, from the transmitted identification information and operating information including the operating position information, which operation has been performed to which operating screen, and then executes operation corresponding to the recognized results. With such structure as controlling the device 200 through operation of the mouse, etc., the cursor can be directly moved to a desired position on the operating screen, thereby improving operability.

Note that only the operation information may be transmitted to the device 200 as the operation request 241. In this case, although the device 200 cannot reliably recognize to which operating screen the operation is directed, the processing can be simplified and the traffic on the transmission path can be reduced. Here, the user operation information may be encoded and then transmitted with the identification information. Alternatively, each user operation information may be sent as a single command (its operand is the control code such as the ID of the screen display data). Furthermore, if a button allowing only selecting operation to the screen display data is pressed, for example, the structure may be as such that only the control code indicating this button is transmitted to the device 200, thereby simplifying the processing and reducing traffic on the transmission path 1.

Next, if the state in the device 200 is changed to cause the screen display data of the device 200 to be changed, the device 200 spontaneously returns screen information 121. The screen information 121 includes the identification information and the screen display data, and its structure is similar to that shown in FIGS. 4(a) to (c). Note that the device 200 may be structured so that the screen information 121 becomes a secondary response to the screen request 101. At this time, the controller 100 receives the secondary response, and then again issues a screen request. Then, if the screen display data is not changed, a primary response to the screen request after the secondary response may include only the identification information without the screen information. With such structure, the correspondence between the request and command can be clarified, and the processing of the device 200 can be simplified.

The screen information 121 is used, by way of example only, for the device 200 to change the display of the operating screen into a display indicative of rewinding if automatic fast-rewinding has started because a tape comes to the end after replay in a VCR. Alternatively, the screen information may be used, by way of example only, for changing a still picture on the operating screen (from a convex display to a concave display) according to the operation such as pressing/releasing a button on the operating screen.

After the screen display data in the controller 100 is updated, the screen display data manager 12 instructs the display/function selection part 14 to update the screen display. The display/function selection part 14 updates the screen display.

Note that, in addition to each request/response, etc., as shown in the present embodiment, other communications may be made between the controller 100 and the device 200. For example, although not shown, the structure may be as such that an acknowledge signal for acknowledging each request and response is returned. With such procedure, the controller 100 can always recognize the state of the device 200.

Figure 6:
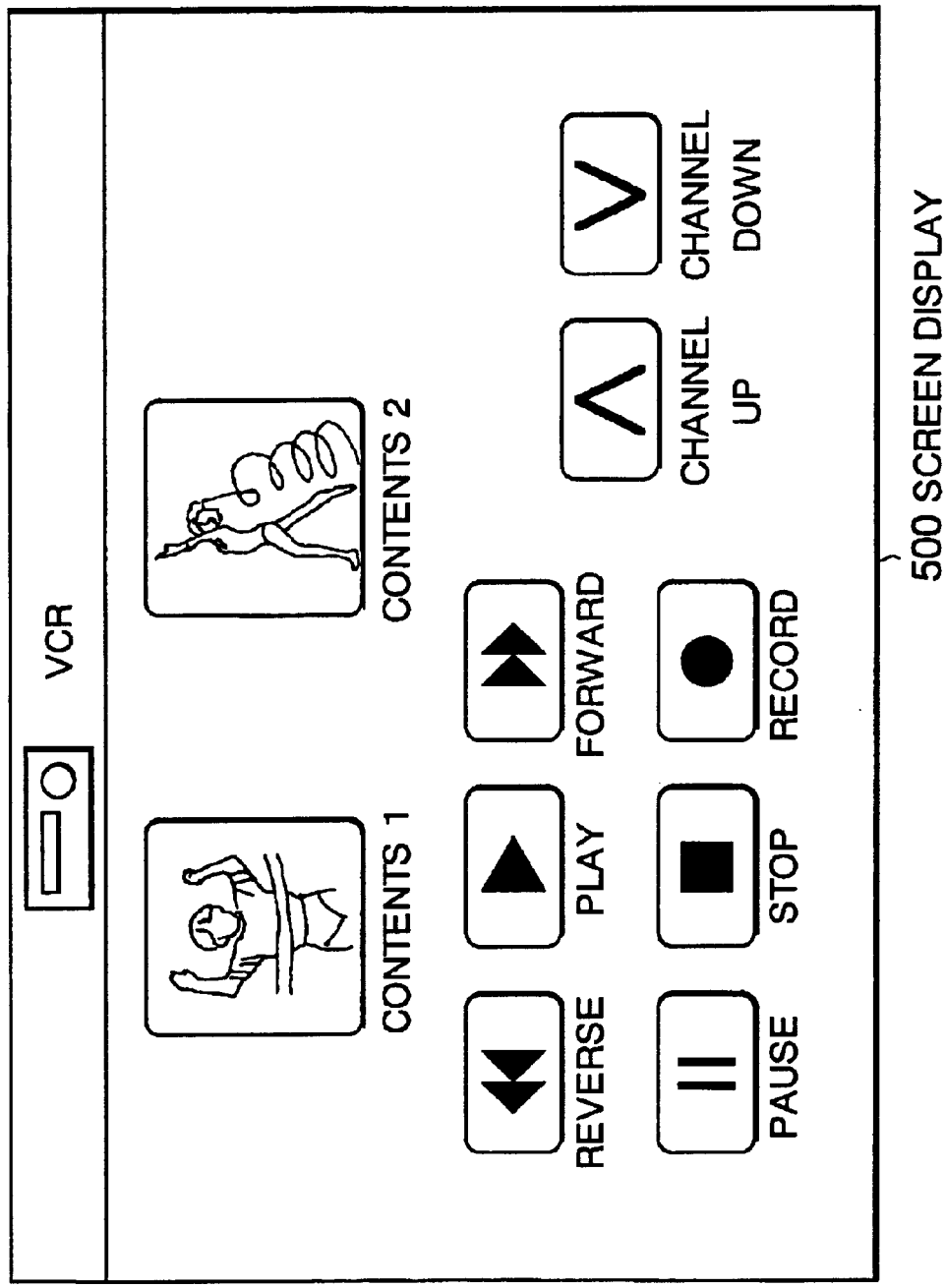
FIG. 6 is a diagram showing one example of an operating screen displayed on the controller in the first embodiment.

FIG. 6 is showing one example of the operating screen displayed on the controller in the first embodiment. In this example, a screen display 500 represented by the screen display data transmitted from the device is displayed as the operating screen of the VCR. Displayed on the screen display 500 are a display element indicating that the device to be controlled is the VCR; two title images as contents information; reverse, play, fast-forward, pause, stop, and record buttons as control information; and channel up and down buttons.

Figure 7:
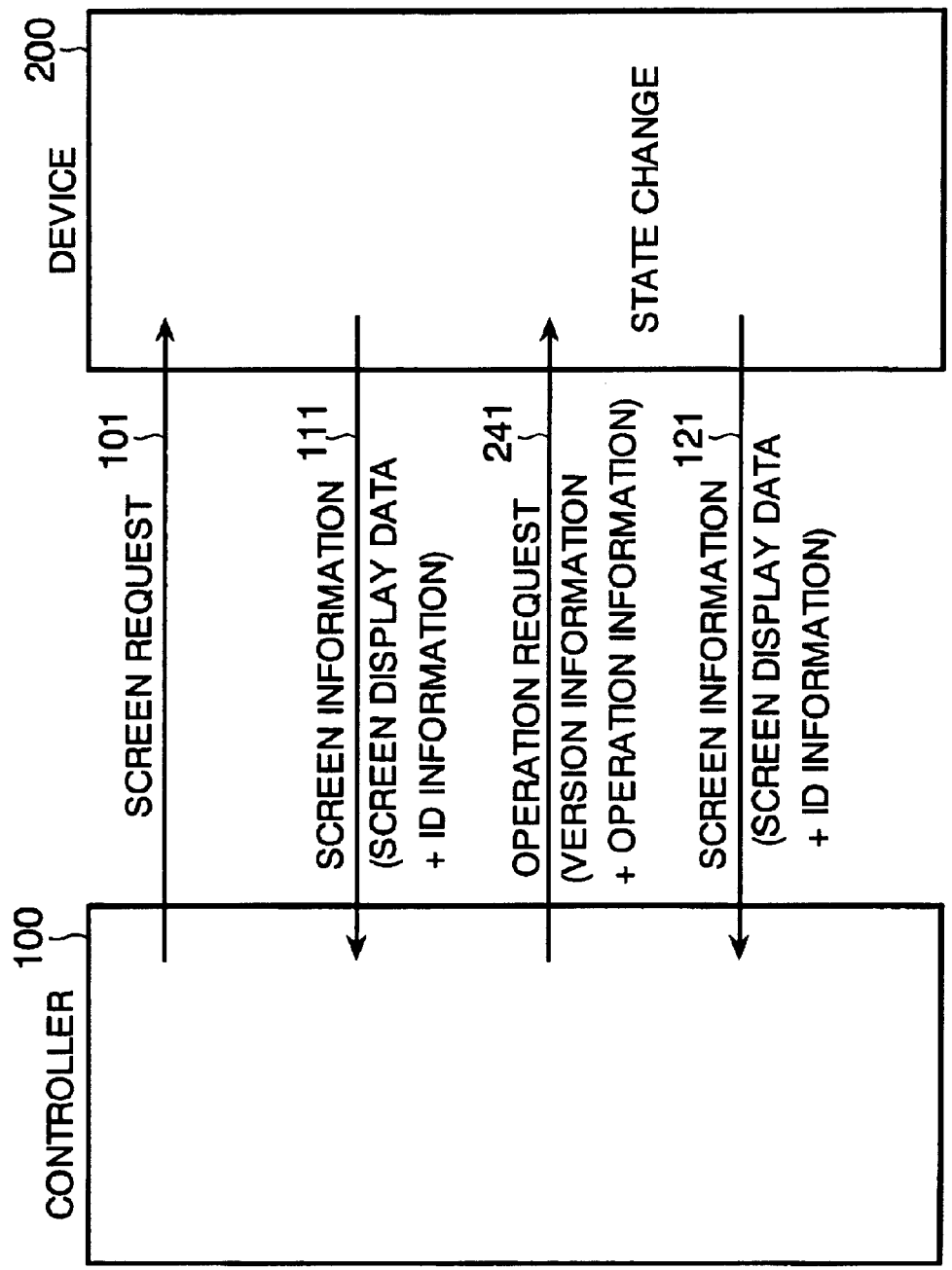
FIG. 7 is a diagram illustrating another protocol of the network control system in the first embodiment.

In the protocol shown in FIG. 5, the operation information and the identification information of the screen display data are sent from the controller 100 to the device 200 as the operation request. Alternatively, as shown in FIG. 7, the version information may be used instead of the identification information in the operation request 241. With this version information, the device 200 can determined to which operating screen the operation is directed, thereby obtaining the effect similar to that in a case where the protocol shown in FIG. 5 is used.

In the present embodiment, assuming that the version information of the screen display data is sent from the device to the controller as part of the screen information as shown in FIGS. 4(b) and (c), a change of state information of the device can be reported to the controller by using the version information, and to which screen display data the operation information from the controller is directed can be easily determined. Therefore, the device can change its own state information at an arbitrary time. In other words, even between the time the controller detects a change in the state information of the device and the time the controller takes in the state information, the device may change its own state information. Therefore, the device is not required to use a buffer for temporarily storing the change in the state information, thereby simplifying the processing and reducing its storage area.

Note that the present invention is not applied only when the screen display data of the device is updated, but can also be applied when the controller keeps track of arbitrary screen display data of the device. By way of example only, the present system is effective also for a monitoring system for monitoring for intruders with images changed and a system for keeping track of the state of a device operating at a remote site.

<1.6 Effects of the First Embodiment>

As described above, according to the present embodiment, the device has screen display data representing an operating screen of the device and identification information of the screen display data. The controller reads the screen display data and the identification information from the device. If the identification information includes version information, a change of the operating screen information of the device can be detected by the identification information. Therefore, the controller can easily detect that the state of the device has been changed according to an instruction from another controller or a change made spontaneously by the device itself. Also, the controller can easily and reliably identify the operation information in which the state of the device has been correctly reflected. Moreover, the device can easily and reliably recognize to which operating screen the operation is directed, thereby executing the operation as the user desires.

Further, according to the present embodiment, the controller manages the screen display data representing the operating screen for the device, and transmits the operation information to the device based on the operation by the user. However, the controller does not have to understand the meaning of the function of the device or the operation (the relation between the operation and the function of the device). In other words, user interface information (screen display data, operation information, etc.,) is managed and processed by the controller, while control information directly related to device control (information indicating the function of the device, information indicating the relation between the function of the device and the operation, etc.,) is by the device. Therefore, according to the present embodiment, the processing in the controller is reduced.

<2. Second Embodiment>

Next, a network control system according to a second embodiment of the present invention is described. The structures of the device and controller in the present embodiment are similar to those in the first embodiment, and therefore the same components are provided with the same reference numerals, and their description is omitted herein (refer to FIGS. 1 and 2).

<2.1 Screen Information in the Second Embodiment>

Figure 8:
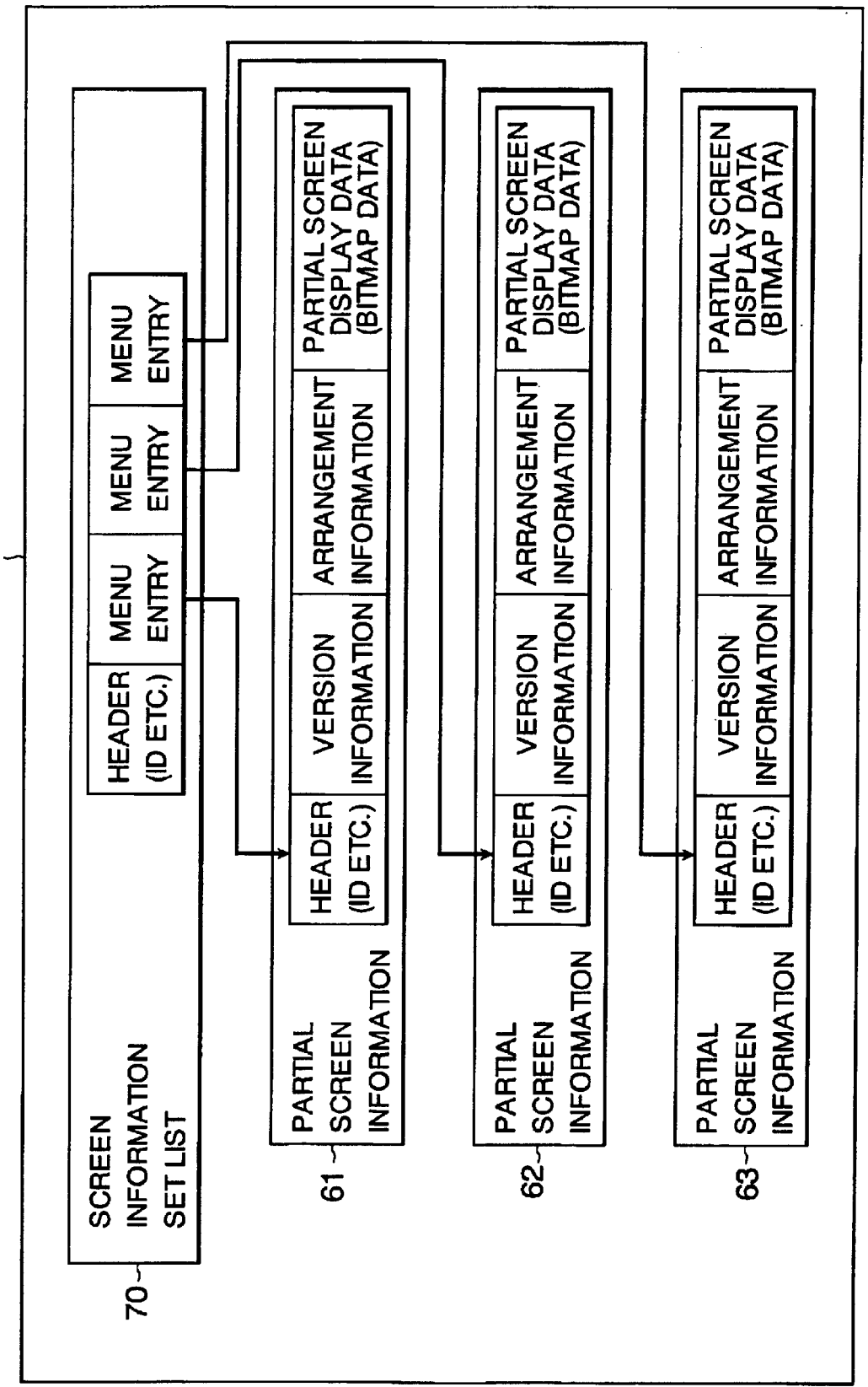
FIG. 8 is a diagram showing the structure of screen information sent from a device to a controller in a second embodiment of the present invention.

FIG. 8 is a diagram showing the structure of screen information sent from the device to the controller in the present embodiment. In the present embodiment, the screen information is constructed of a plurality of partial screen information corresponding to partial screen display data obtained by dividing screen display data indicative of an operating screen into two or more partial screen displays. Each partial screen information is in a list format, including various header information and attribute information. However, such partial screen information does not have to be in a list structure. Alternatively, each partial screen information may be independent, or a screen information set list does not have to be required.

Screen information 53 shown in FIG. 8 is constructed of a screen information set list 70, and partial screen information 61, 62, and 63. The structure of a header in the screen information is similar to that in the first embodiment. The screen information set list 70 is constructed of an identifier corresponding to the screen information 53 and a plurality of menu entries. In each menu entry, an identifier for each partial screen display data in the partial screen information 61 to 63 in the screen information 53 is set.

Each partial screen information 61 to 63 is constructed of a header, version information, arrangement information, and the partial screen display data. Here, the partial screen display data is bitmap data for displaying a partial screen that composes part of an operating screen corresponding to the screen information 53. The header and version information are similar to those in the first embodiment. The arrangement information is information for specifying where the partial screen display data is placed on the operating screen corresponding to the screen information 53.

Figure 9:
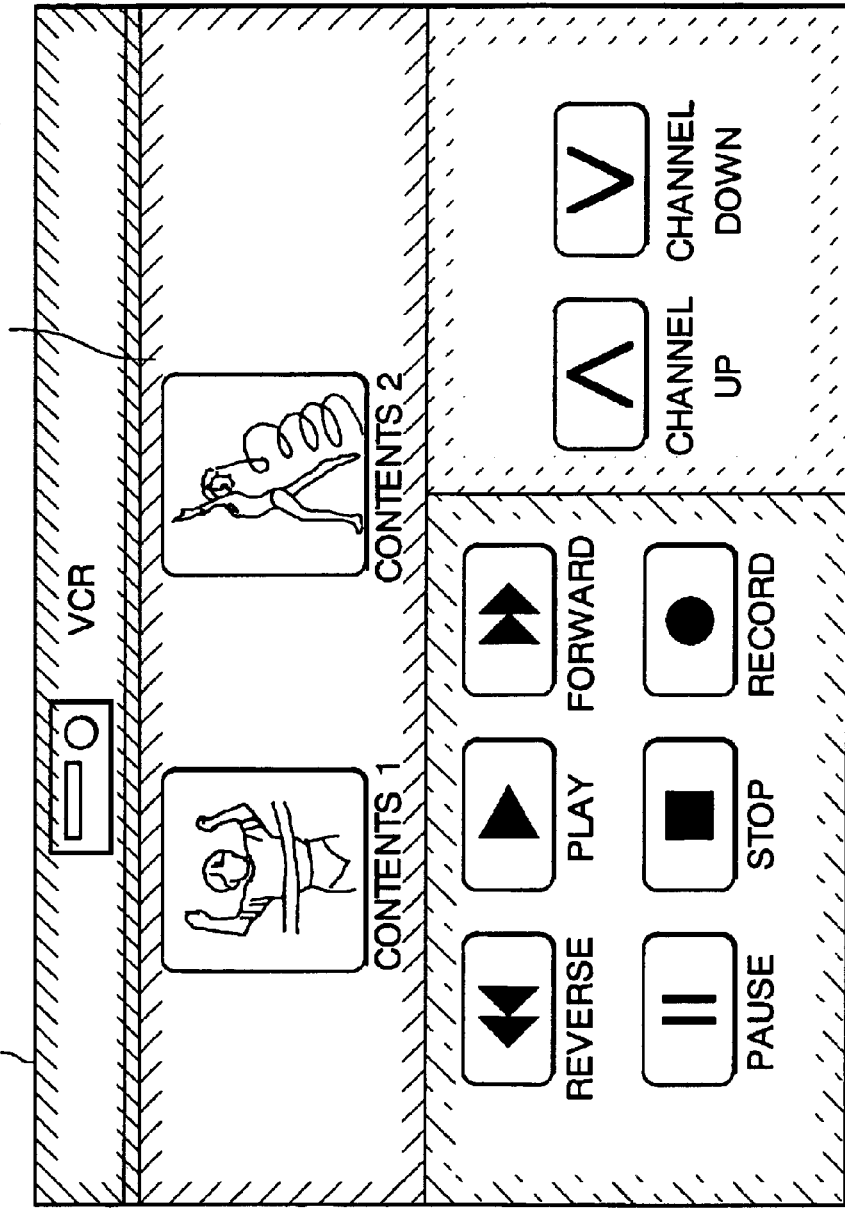
FIG. 9 is a diagram showing one example of an operating screen displayed on the controller in the second embodiment.

FIG. 9 is a diagram showing one example of the operating screen displayed on the controller in the present embodiment. In this example, the operating screen is constructed of four partial screen displays 501, 502, 503, and 504. Therefore, the screen display data representing the operating screen is constructed of four partial screen display data corresponding to these four partial screen displays. As shown in FIG. 9, in the present embodiment, the screen display data is divided into a plurality of partial screen display data in such a manner that a display element indicative of a single meaning to the user is not divided.

<2.2 Version Management in the Second Embodiment>

Figure 10:
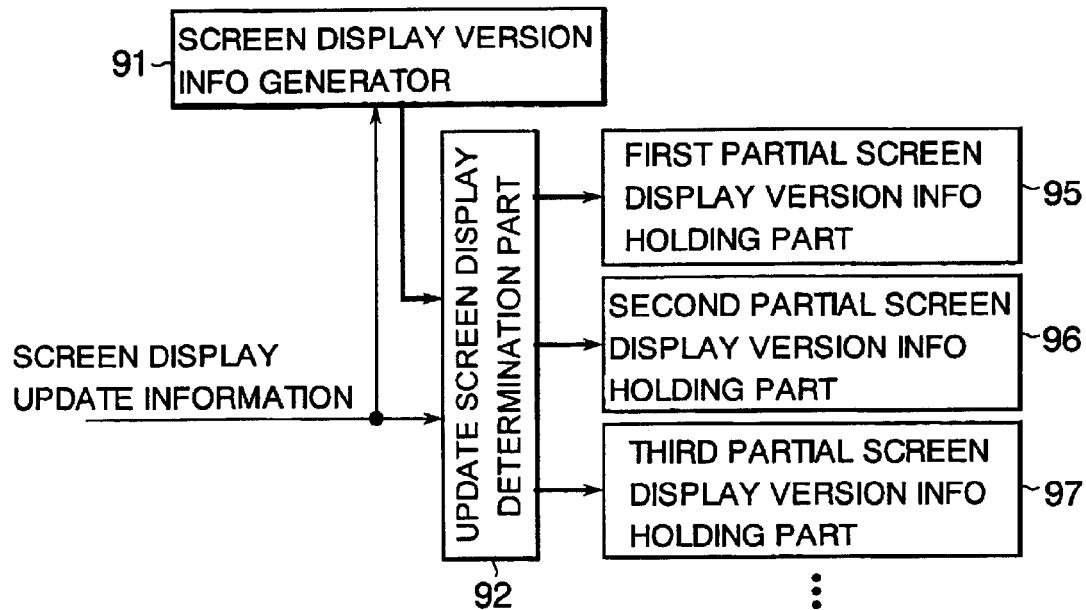
FIG. 10 is a block diagram showing the configuration of a version manager of the device in the second embodiment.

FIG. 10 is a block diagram showing the configuration of a part in the information manager 18 of the device carrying out management of a version of the screen display data (hereinafter referred to as "version manager"). The version manager in the present embodiment is constructed of a screen display version generator 91, an update screen display determination part 92, and a plurality of partial screen display version information holding parts 95, 96, 97, . . . .

In the above constructed version manager, the screen display version information generator 91 manages the version of the screen display data generated by the screen display data generator 20. The screen display version information generator 91 is implemented by using a counter, and obtains screen display update information from the unit internal controller 9 every time the screen display data generated by the screen display data generator 20 is changed by the information manager 18 to increment the counter. The counter is an infinite cyclic counter having a sufficient finite bit length, and indicates a minimum value after incremented to be the maximum. The bit length of the counter is arbitrarily determined. Preferably, however, the bit length is sufficient enough to prevent one cycle of the counter value from being complete at least while the controller holds control or has access to a change of state in order to avoid the same counter value from indicating different screen display data.

The update screen display determination part 92 uses the screen display update information obtained from the unit internal controller 9 to detect which partial screen display data has been changed, and caused the partial screen display version information holding part corresponding to the partial screen display data to store version information of the updated partial screen display data.

The first partial screen display version information holding part 95 holds version information of any partial screen display data composing the screen display data indicative of the operating screen for the device. The version information of this partial screen display data (hereinafter referred to as "first partial screen display data") is, for example, version information of the partial screen display data in the partial screen information 61 shown in FIG. 8, that is, the version information constructing the partial screen information 61.

The second partial screen display version information holding part 96 holds version information of any partial screen display data, but other than the above first partial screen display data, composing the screen display data indicative of the operating screen for the device. The version information of a second partial screen display data is, for example, version information of the partial screen display data in the partial screen information 62 shown in FIG. 8, that is, the version information constructing the partial screen information 62.

The third partial screen display version information holding part 97 holds version information of any partial screen display data, but other than the above first and second partial screen display data, composing the screen display data indicative of the operating screen for the device. The version information of a third partial screen display data is, for example, version information of the partial screen display data in the partial screen information 63 shown in FIG. 8, that is, the version information constructing the partial screen information 63.

Figure 11:
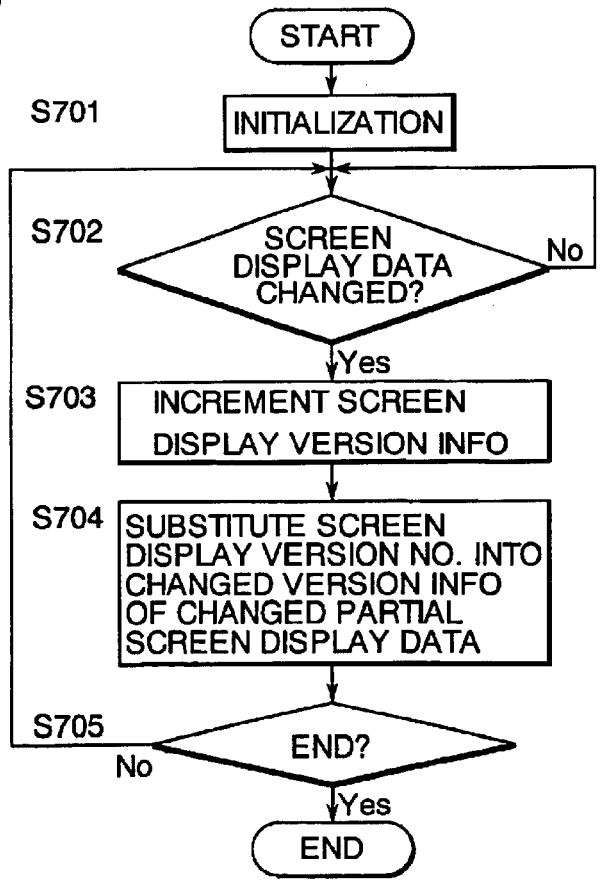
FIG. 11 is a flowchart showing the operation of the version manager of the device in the second embodiment.

FIG. 11 is a flowchart showing the operation of the version manager in the information manager 18 of the device. In the version manager, when the device is activated, the screen display version information generator 91 first initializes the version information of all partial screen display data, for example, setting the version information to "0" (step S701). Next, the version manager waits until the screen display data is changed (step S702). When the screen display data is changed, the screen display version information generator 91 increments the counter to update the version information of the screen display data (step S703). The incremented counter value indicates a screen display version number after update. Next, the update screen display determination part 92 detects using the screen display update information which partial screen display data has been changed, and then causes the partial screen display version information holding part concerned with the changed partial screen display data to update the version information thereof. That is, the screen display version number is substituted into the version information of the partial screen display data, which is the counter value incremented of the screen display version information generator 91 (step S704). In this way, after the version information of the partial screen display data is updated, it is determined whether an instruction for ending this series of processing by the version manager is provided (step S705). If not, the procedure returns to step S702 to repeat the above series of processing (steps S702 to S705). While the device 200 is powered on, the procedure repeats the above series of processing. If it is determined yes (step S705), the series of processing ends.

By way of example only, when the second partial screen display data is changed, the above version manager operates as follows. First, the screen display version information generator 91 obtains screen display update information indicative of the change of the second partial screen display data from the unit internal controller 9 to increment the counter of the screen display version information generator 91, thereby updating the version information of the screen display data. The update screen display determination part 92 detects by this screen display update information that the changed display element belongs to the second partial screen display data, and causes the second partial screen display version information holding part 96 to update the version information of the partial screen display data.

FIG. 12 is a diagram illustrating how the screen display data and the version information of each partial screen display data change. Here, assume that the screen display data indicative of the operating screen of the device is constructed of first to third partial screen display data.

At the initial state, all items of the version information have been initialized. That is, the screen display version number and each partial screen display version number are set to "0". Here, if a display element of the second partial screen display data is changed, the counter of the screen display version information generator 91 is incremented, thereby setting the screen display version number and a second partial screen display version number to "1". Then, if a display element of the third partial screen display data is changed, the above counter is updated as such that the screen display version number and a third partial screen display version number are both set to "2". At this time, the second partial screen display version number still indicates "1". Then, if a display element of the second partial screen display data is changed again, the above counter is further incremented as such that the screen display version number and the second partial screen display version number are both set to "3". In other words, the second partial screen display version number has not and will not become "2".

In this way, if any display element is changed, the counter of the screen display version information generator 91 is incremented, and the screen display version number and the version number of the partial screen display data to which the changed display element belongs are both updated to take the counter value after increment <2.3 Control Operation in the Second Embodiment>

FIG. 13 is a diagram illustrating a protocol of the network control system in the second embodiment. Using the drawing, the control operation of the controller and device is now described below. Note that the operation other than the control operation described below is similar to that in the first embodiment.

When the device 200 is newly connected to the transmission path 1, the controller 100 on this transmission path 1 issues, like the first embodiment, the screen request 101 to the new device 200. In response, the new device 200 sends screen information 111b, and the controller 100 reads the screen information thereinto. At this time, the screen information 111b sent from the device 200 is the screen information 53 including the screen information set list 70 shown in FIG. 8. However, without using the screen information set list 70, all partial screen information may be sent as the screen information 111b.

Then, when the user carries out operation to the device 200 through the operating screen for the controller 100 as a user interface, the controller 100 transmits the identification information of the screen display data indicative of the operating screen and the operation information indicative of the operation to the device 200 as the operation request 241, like in the first embodiment. At this time, the identification information may include version information.

Then, if the state in the device 200 is changed and thereby the screen display data in the device 200 is changed, the device 200 spontaneously transmits partial screen information 121b to the controller 100. Unlike the screen information 121 transmitted from the device 200 to the controller 100 in the first embodiment, this partial screen information 121b is composed of the partial screen display data to which a changed display element belongs and its identification information. That is, in the present embodiment, if the screen display data is changed, the partial screen display data to which the changed display element belongs is transmitted to the controller 100. In the controller 100, after receiving this partial screen display information 121b, the screen display data manager 12 updates, among the partial screen display data held in the screen display data holding part 21, the partial screen display data indicated by the identification information of the partial screen information 121b with the partial screen display data of the partial screen information 121b. In addition to the partial screen display data, the version information held in the screen display data holding part 21 is also updated.

<2.4 Effects of the Second Embodiment>

In the present embodiment, as shown in FIG. 9, the screen display data is divided into a plurality of partial screen display data in such a manner that a display element indicative of a single meaning to the user is not divided. Therefore, if only a single element is changed, the plurality of the partial screen display data are not required to be sent. Thus, the data amount to be transferred to the controller when the screen display is changed is reduced, and the processing in the device and the controller is simplified.

Furthermore, according to the present embodiment, an identifier is provided for each partial screen display data. If the screen display data is changed, the partial screen display data to which a changed display element belongs and its identifier are sent to the controller. Therefore, the changed partial screen display data can be easily specified. Moreover, at this time, the version information of the partial screen display data is also transmitted to the controller. With this version information, the controller can prevent erroneous display.

Note that a manner of dividing the screen display data may vary every time the device changes the screen display data according to the change of the information in the device. By way of example, the controller always reconstructs the partial screen display data transmitted from the device to create a frame of screen display data. The created screen display data is stored in screen display data holding part 21. Then, the partial screen display data updated by the device is superimposed on the screen display data held in the screen display data holding part 21 for update. With such structure, the device can transmit partial screen display data of an arbitrary size at an arbitrary position to the controller, thereby simplifying the transmission amount and the processing of the controller and device. Moreover, at this time, in response to the user's operation, the controller sends the version information of the screen display data together with the user operation information to the device.

<3. Third Embodiment>

Next, a network control system according to a third embodiment of the present invention is now described. Since the structure of the device and controller in the present embodiment is similar to that in the first embodiment, the same components are provided with the same reference numerals, and their description is omitted herein (refer to FIGS. 1 and 2).

Furthermore, the structure of the screen information in the present embodiment is similar to that in the second embodiment (refer to FIG. 8) in that the screen display data indicative of the operating screen of the device is composed of a plurality of partial screen display data. However, the present embodiment is different from the second embodiment in the manner of dividing the screen display data into a plurality of partial screen display data.

Figure 14:
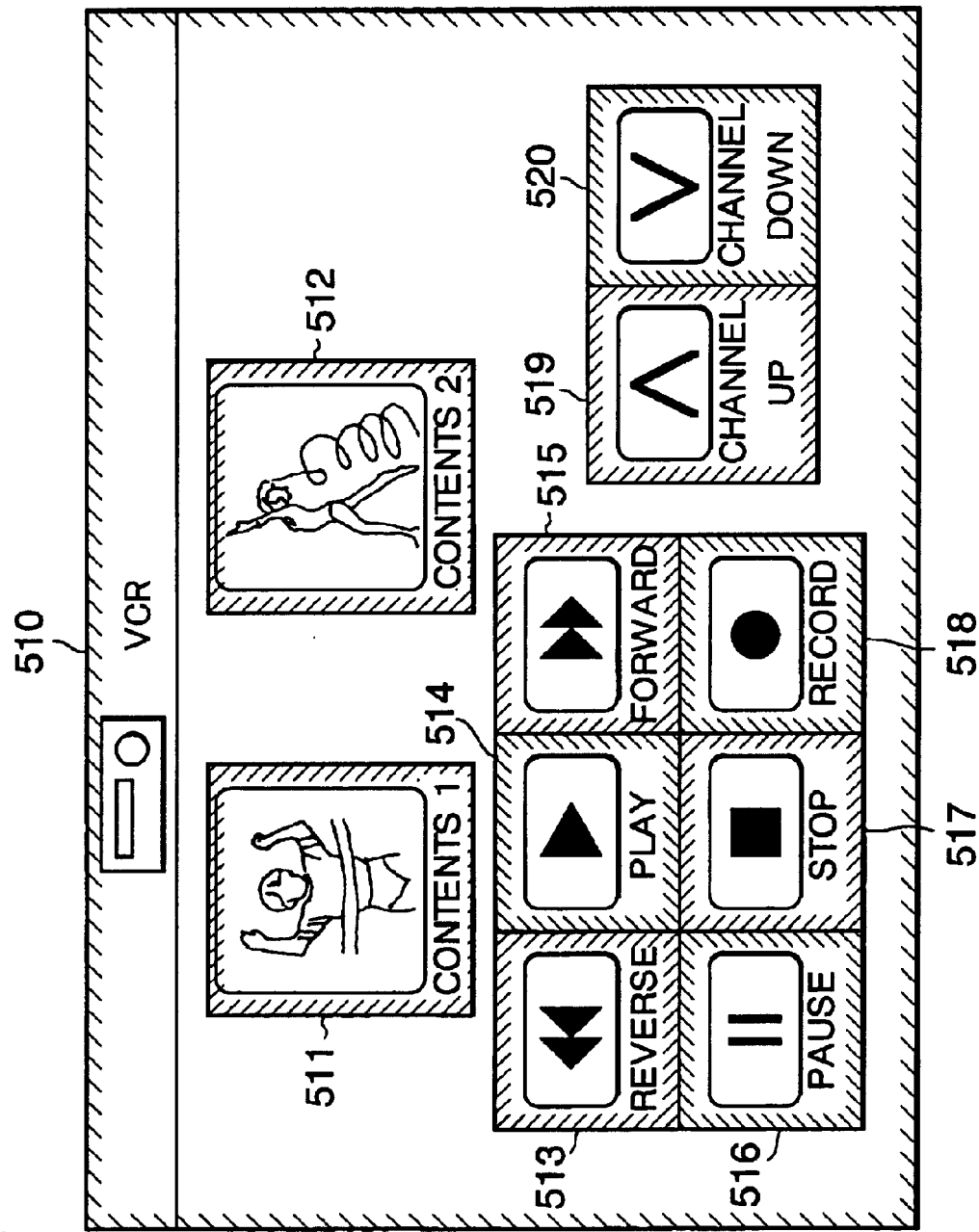
FIG. 14 is a diagram showing one example of an operating screen displayed on the controller in a third embodiment of the present invention.

FIG. 14 is a diagram showing one example of the operating screen displayed on the display screen of the controller in the present embodiment. In the present embodiment, the partial screen display data is generated for one or more display elements selected through a single operation by the user, that is, for every operation. The screen display data is constructed of this partial screen display data generated in the above described manner, and partial screen display data representing a display which is a base for the display elements indicated by the generated partial screen display data. For example, the operating screen shown in FIG. 14 is constructed of a plurality of partial screen displays 511 to 520 and partial screen display 510 which is a base for these partial screen displays 511 to 520 (hereinafter referred to as "base screen display"). Therefore, the screen display data indicative of the operating screen of FIG. 14 is composed of the partial screen display data corresponding to these partial screen display 511 to 520. Each display element as an operation unit that corresponds to each of the plurality of partial screen displays 511 to 520 is superimposed onto the partial screen display 510, that is, the base screen display for overlap display.

Figure 15:
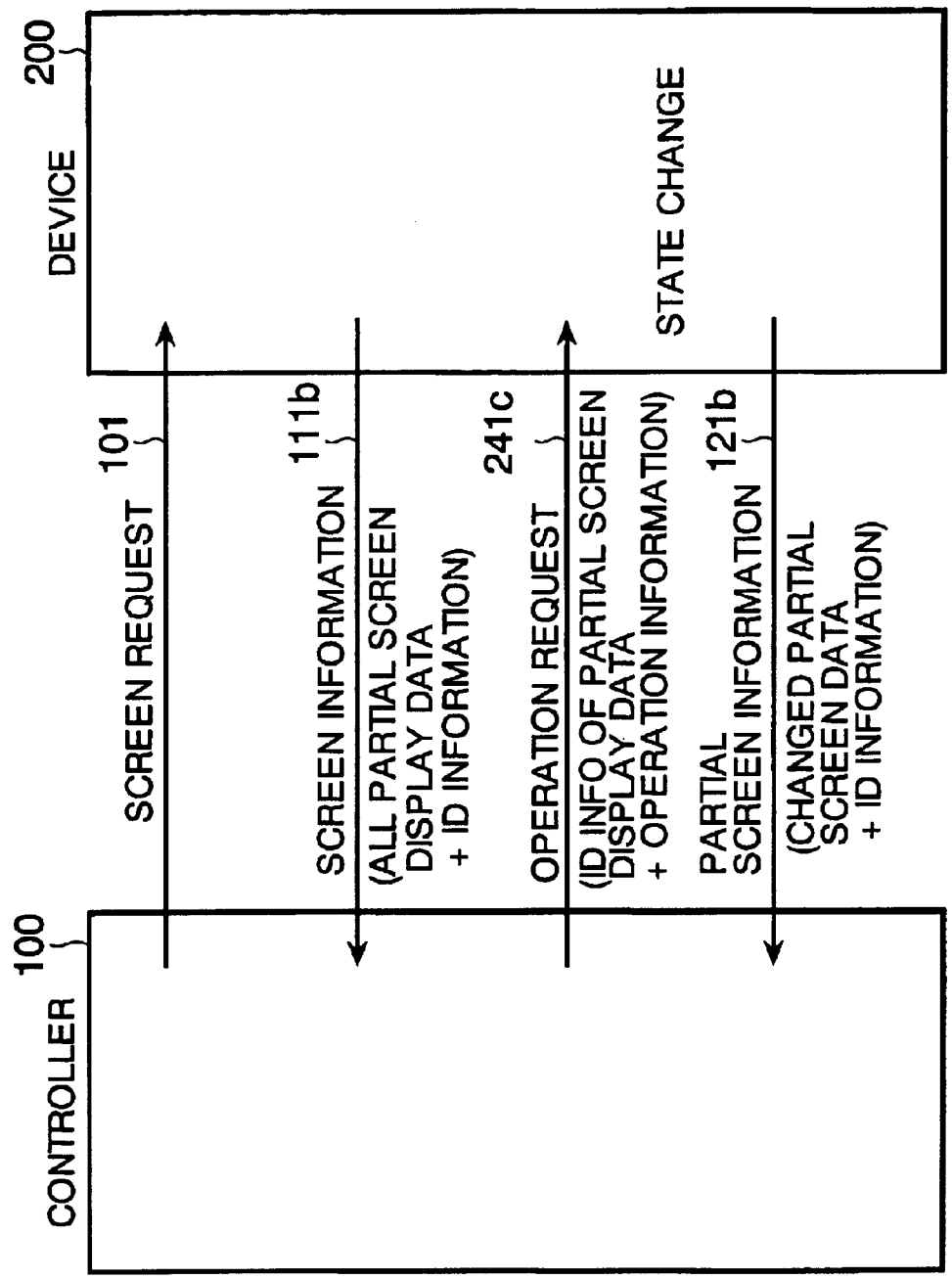
FIG. 15 is a diagram illustrating a protocol of a network control system in the third embodiment.

FIG. 15 is a diagram illustrating a protocol of the network control system in the present embodiment. By using the drawing, the control operation of the controller and device is now described below. Note that the operation other than the control operation described below is similar to that in the second embodiment.

The controller 100 issues the screen request 101 to the device 200. In response, the device 200 transmits the screen information 111*b* to the controller 100. Then, when the user carries out operation to the device 200 through the user interface of the controller 100, the controller 100 issues an operation request 241*c* to the device 200. By issuing the operation request 241*c*, the controller 100 sends identification information of the partial screen display data to which a display element to be operated by the user belongs and operation information indicative of the operation to the device 200. In other words, as to the operation request 241*c* in the present embodiment, the identification information of the partial screen display data corresponding to the operation is transmitted to the device 200, instead of the identification information of the screen display data indicative of the operating screen. In this point, the present embodiment is different from the second embodiment. In the present embodiment, as shown in FIG. 14, each operation unit displayed on the operating screen has a one-to-one correspondence with each partial screen display data. Therefore, by receiving the operation request 241*c*, the device 200 can easily recognize the user operation included in the operation request 241*c*. In other words, in the device 200, based on the identification information of the partial screen display data and the operation information received as the operation request 241*c*, the device asynchronous data processing part 6 instructs the unit internal controller 9 to execute a function that corresponds to the operation unit indicated by the identification information and the operation information. The unit internal controller 9 executes the function based on the instruction.

Then, when the state in the device 200 is changed and the screen display data in the device 200 is thereby changed, the device 200 spontaneously transmits partial screen information 121*b* to the controller 100. The partial screen information 121*b* is composed of, similarly to the second embodiment, the partial screen display data to which a changed display element belongs and its identification information. After receiving the partial screen information 121*b*, the controller 100 updates, similarly to the second embodiment, the partial screen display data and its version information.

According to the present embodiment as described above, the screen display data indicative of the operating screen is divided for every operation unit. Therefore, the device 200 can easily recognize the user's operation by the identification information of the partial screen display data transmitted from the controller 100 as the operation request 241*c*. Note that, if the partial screen data is divided in such a manner that any operation unit is not divided, the device 200 can easily recognize the operation even if division is made not by each operation unit. This is because, although the operation itself cannot necessarily be specified only with the identification information of the partial screen display data, the type of operation can be narrowed down with the identification information.

Further, in the present embodiment, when one display element is changed, the device 200 transmits to the controller 100 only the partial screen information corresponding to the partial screen display data to which the display element belongs. Therefore, as in the second embodiment, the data amount to be transferred to the controller 100 with change in screen display can be reduced.

Still further, the controller by itself can also make the cursor indicative of the operating position to the user displayed. Therefore, the controller can manage cursor movement, thereby simplifying the processing in the device, reducing the transmission amount, and improving response to the user's operation.

<4. Fourth Embodiment>

Next, a network control system according to a fourth embodiment of the present invention is now described. The structure of the device and controller in the present embodiment is also similar to that in the first embodiment. Therefore, the same components are provided with the same reference numerals, and their description is omitted herein (refer to FIGS. 1 and 2).

Figure 16:
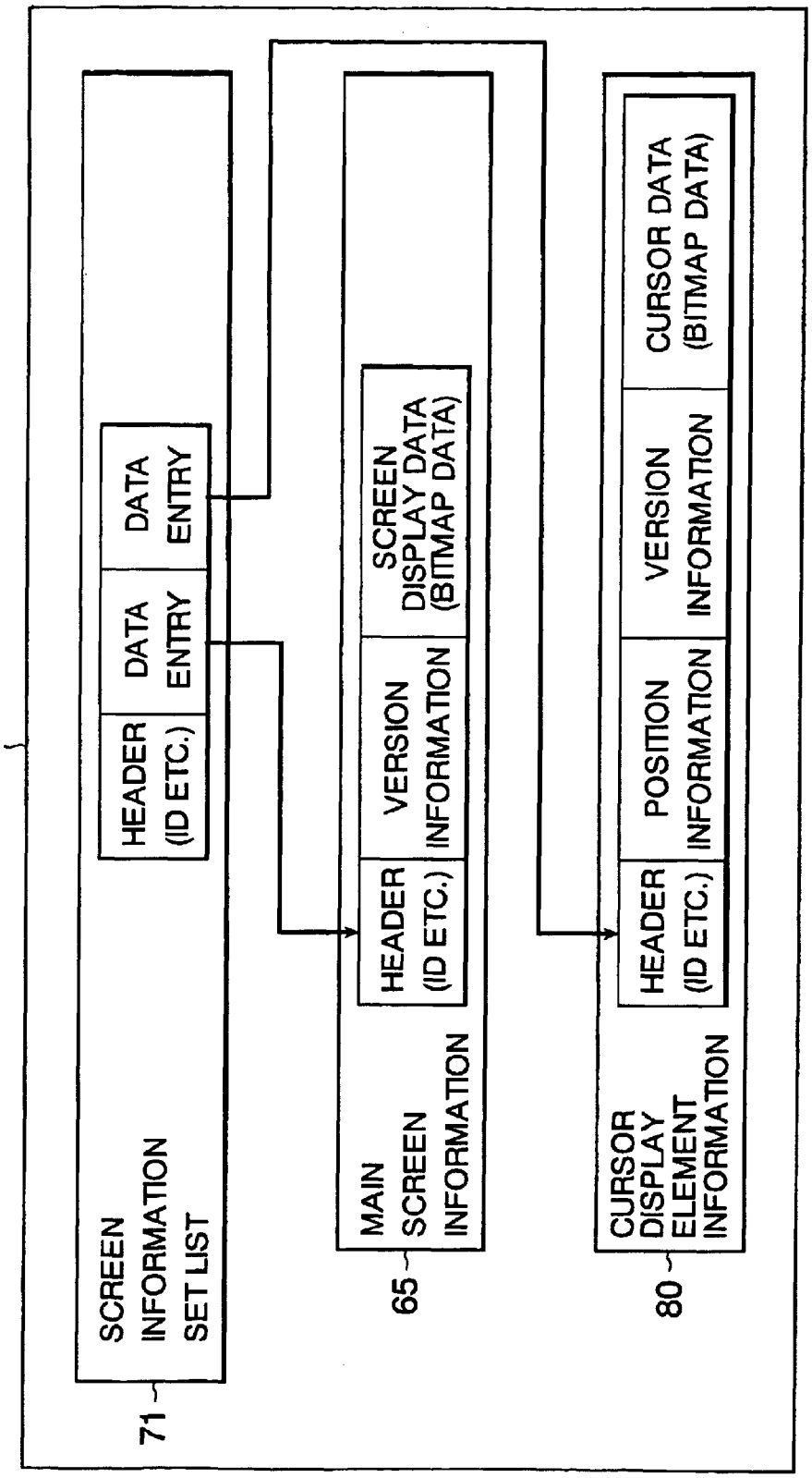
FIG. 16 is a diagram showing the structure of screen information sent from a device to a controller in a fourth embodiment of the present invention.

FIG. 16 is a diagram showing the structure of screen information 54 sent from the device to the controller in the fourth embodiment of the present invention. The screen information 54 is constructed of a screen information set list 71 main screen information 65, and cursor display element information 80. In the present embodiment, a cursor display element indicative of the operating position of the user is superimposed on the operating screen for overlap display. The operating screen itself corresponds to the main screen information 65, while the cursor display element to the cursor display element information 80. As shown in FIG. 16, the main screen information 65 is composed of screen display data as bitmap data indicative of the operating screen, a header including an identifier of the screen display data, and version information of the screen display data. The cursor display element information 80 is composed of cursor data as bitmap data representing the cursor display element, a header including an identifier of the cursor data, version information of the cursor data, and position information indicative of the position of the cursor. The screen information set list 71 is composed of a header including an identifier of the screen display data indicative of the operating screen, in a broad sense, including the cursor display element (broad-sense screen display data), a data entry to the main screen information 65, and a data entry to the cursor display element information 80. The identifier of the screen display data indicative of the operating screen itself is set as the data entry to the main screen information 65, while the identifier of the cursor data is set as the data entry to the cursor display element.

Figure 17:
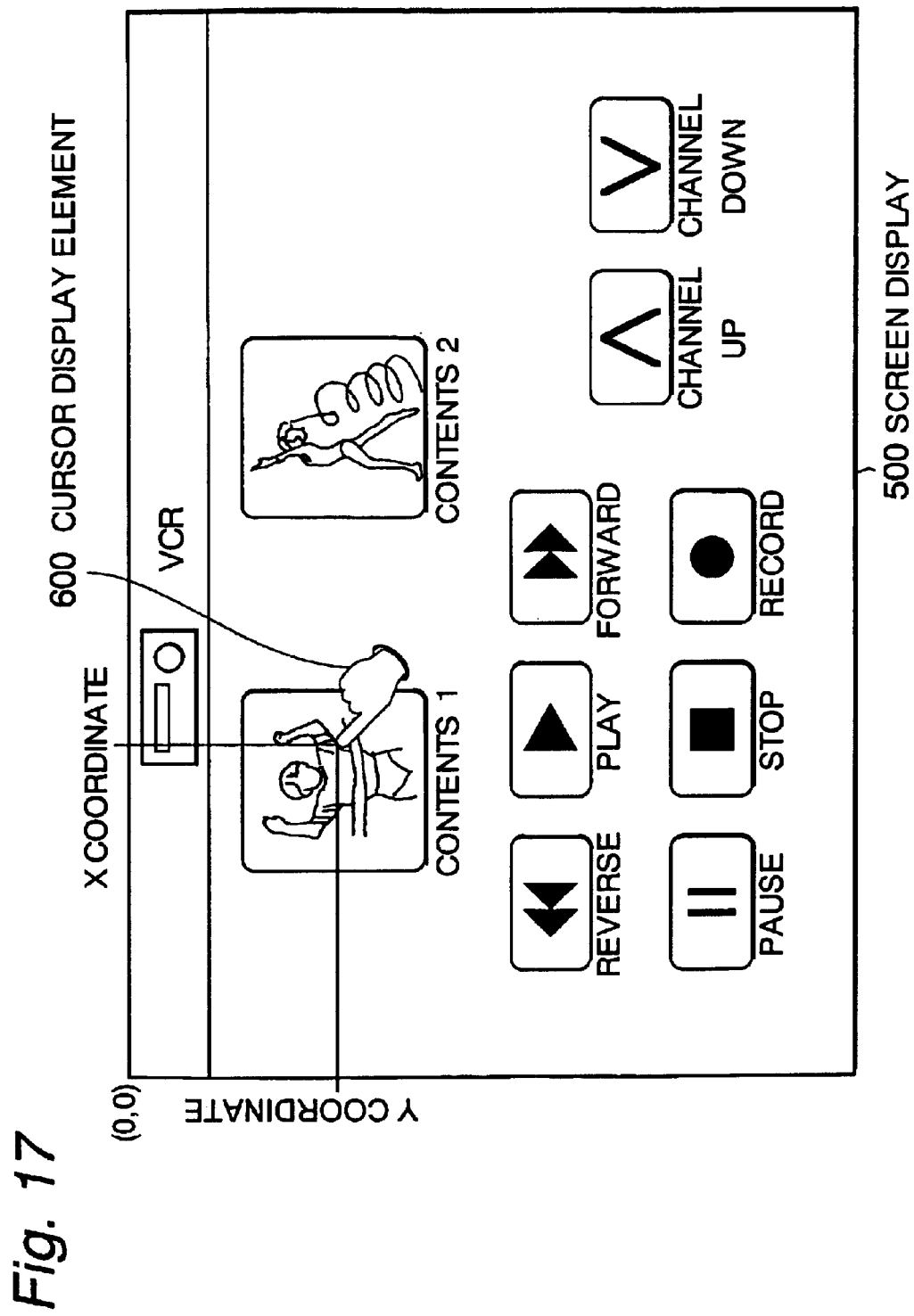
FIG. 17 is a diagram showing one example of an operating screen displayed on the controller in the fourth embodiment.

FIG. 17 shows one example of the operating screen displayed on the display screen of the controller in the present embodiment. In this example, a cursor display element 600 is superimposed onto a screen display 500, which is the operating screen itself, for overlap display. Note that it can be thought that the broad screen display data indicative of the broad operating screen that includes the cursor display element 600 is composed of two pieces of partial screen display data corresponding to the screen display 500 and the cursor display element 600. Furthermore, the cursor position on the operating screen is represented by coordinate values (X and Y coordinates) taking an upper-left corner of the screen display 500 as the origin.

The protocol of the network control system in the present embodiment is basically similar to that in the second embodiment as shown in FIG. 13. In the present embodiment, the screen information 111b transmitted from the device 200 to the controller 100 as a response to the screen request 101 is constructed as shown in FIG. 16. The main screen information 65 and the cursor display element information 80 correspond to different partial screen display information in the second embodiment. After receiving such screen information, the controller 100 displays the operating screen using the screen display data of the main screen information 65 and, by using the cursor data and position information of the cursor display element information 80, further superimposes the cursor display element onto the operating screen for overlap display.

If the controller 100 issues the operation request 241, the operation information is transmitted to the device 200 together with the identification information of the screen display data. The operation information includes the operating position information indicative of the operating position of the cursor. The operating position information is composed of X and Y coordinates on the operating screen.

After issuance of the operation request 241, when the state in the device 200 is changed and therefore the screen display data in the device 200 is changed, the device 200 spontaneously transmits the partial screen information 121b to the controller 100, like in the second embodiment. At this time, in the present embodiment, as to cursor movement, only the cursor display element information 80 shown in FIG. 16 is sent to the controller 100. After receiving, the controller 100 updates overlap display of the cursor display element on the operating screen based on the position information included in the cursor display element information 80. Therefore, according to the present embodiment, the response speed to cursor move operation is improved.

Note that the bitmap data of the cursor may be transmitted only in the first response (screen information 111b) to the screen request, and screen information transmitted thereafter does not have to include the bitmap data of the cursor. Therefore, the processing can be simplified, the transmission amount can be reduced, and the response speed can be improved. Furthermore, the structure may be as such that the bitmap data indicative of the cursor is sent not from the device, but determined by the controller itself. At this time, as to cursor movement, etc., the device transmits only the updated cursor position information as screen information, thereby simplifying the processing, reducing the transmission amount, and improving the response speed.

<4.1 Modified Example of the Fourth Embodiment>

Figure 18:
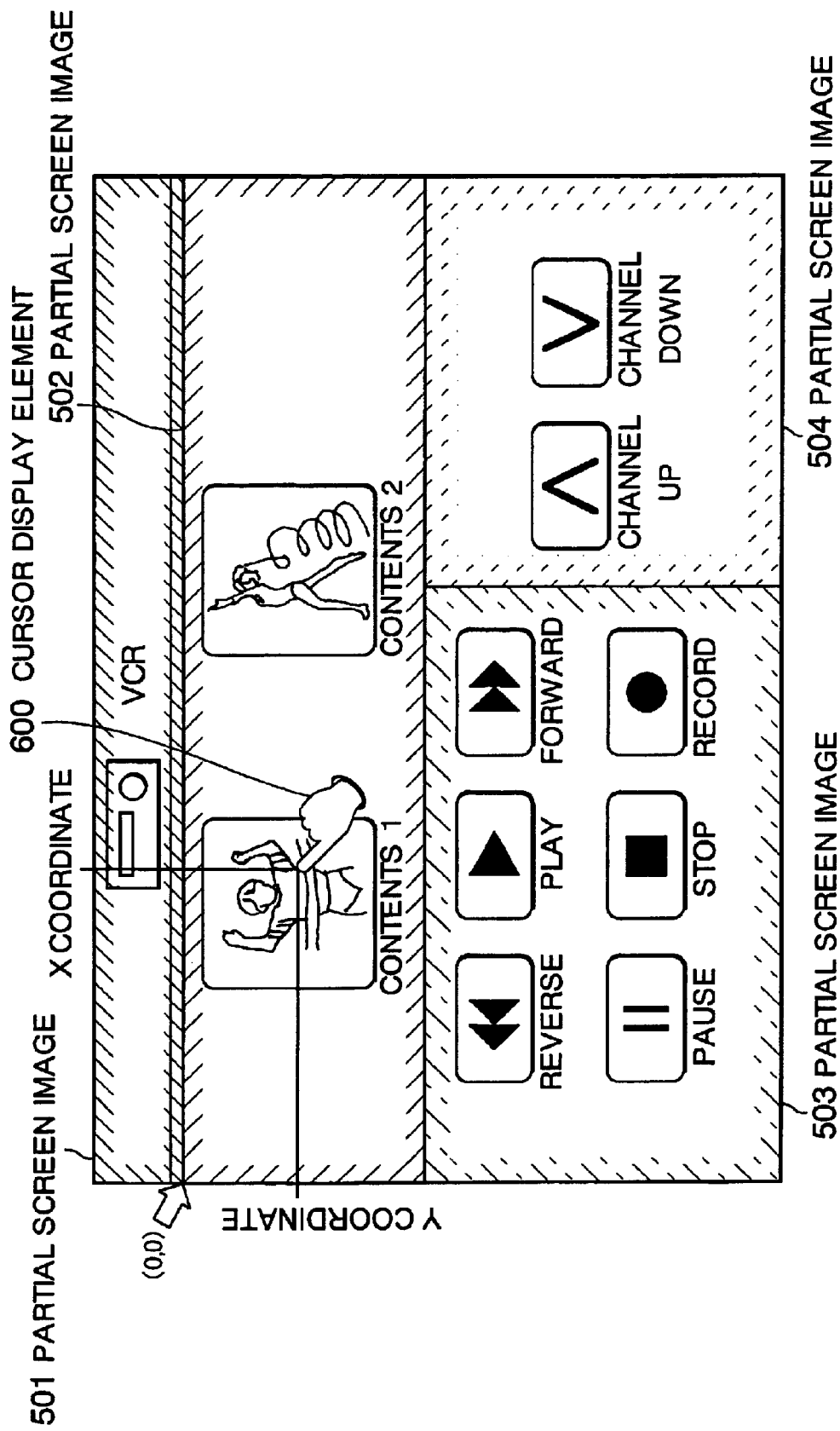
FIG. 18 is a diagram showing one example of an operating screen displayed on the controller in a modified fourth embodiment.

In the above embodiment, the operating screen itself is represented by single screen display data. However, as in the second embodiment, the operating screen may be represented by a plurality of partial display screen data. FIG. 18 is a diagram showing one example of display of the operating screen in the present embodiment represented by a plurality of partial screen display data. In this example, the operating screen is composed of four partial screen displays 501, 502, 503, and 504, and a cursor display element 601 is superimposed onto this operating screen for display. Therefore, in this case, the main screen information 65 in the screen information 54 shown in FIG. 16 is replaced by a plurality of partial screen display information as shown in FIG. 8. Note that the cursor display element information can be considered as one type of partial screen display information.

In this case, the structure of the cursor display element information is similar to that of the cursor display element information 80 shown in FIG. 16. This information in the cursor element information is represented by the coordinates on the operating screen in the example shown in FIG. 16. In this case, however, as shown in FIG. 18, the arrangement information is information indicating a relative position on the partial screen display 502 onto which the cursor display element 601 is superimposed for overlap display. That is, the cursor position information is represented by coordinate values (relative X and Y coordinates) taking the upper-left corner of the partial screen display 502 as the origin.

As described above, the protocol of the network control system in a case where the screen display data is composed of a plurality of partial screen display data is basically similar to that in the third embodiment as shown in FIG. 15. In this case, when the user carries out operation through the cursor, the controller 100 issues the operation request 241c to the device 200. At that time, the identification information of the partial screen display data sent to the device 200 includes the identification information of the cursor data. For example, in the case shown in FIG. 18, in addition to the identification information of the partial screen display data of the partial screen display 502, the identification information of the cursor data of the cursor display element 601 is transmitted to the device 200. The device 200 executes a predetermined function based on the identification information of the partial screen display data received as the operation request 241c (including the identification information of the cursor data) and the operation information.

Then, when the state in the device 200 is changed and therefore the screen display data in the device 200 is changed, the device 200 spontaneously transmits the partial screen information 121b to the controller 100. When the controller 100 issues the operation request 241c based on cursor move operation by the user, all that is changed on the operating screen is the position of the cursor display element. Therefore, only the partial screen information 121b including the cursor display element information is transmitted to the controller 100. After receiving, based on the position information included in the cursor display element information, the controller 100 superimposes the cursor display element onto the operating screen for overlap display.

<5. Fifth Embodiment>

Next, a network control system according to a fifth embodiment of the present invention is now described. The structure of the device and controller in the present embodiment is also similar to that in the first embodiment. Therefore, the same components are provided with the same reference numerals, and their description is omitted herein (refer to FIGS. 1 and 2).

Figure 19:
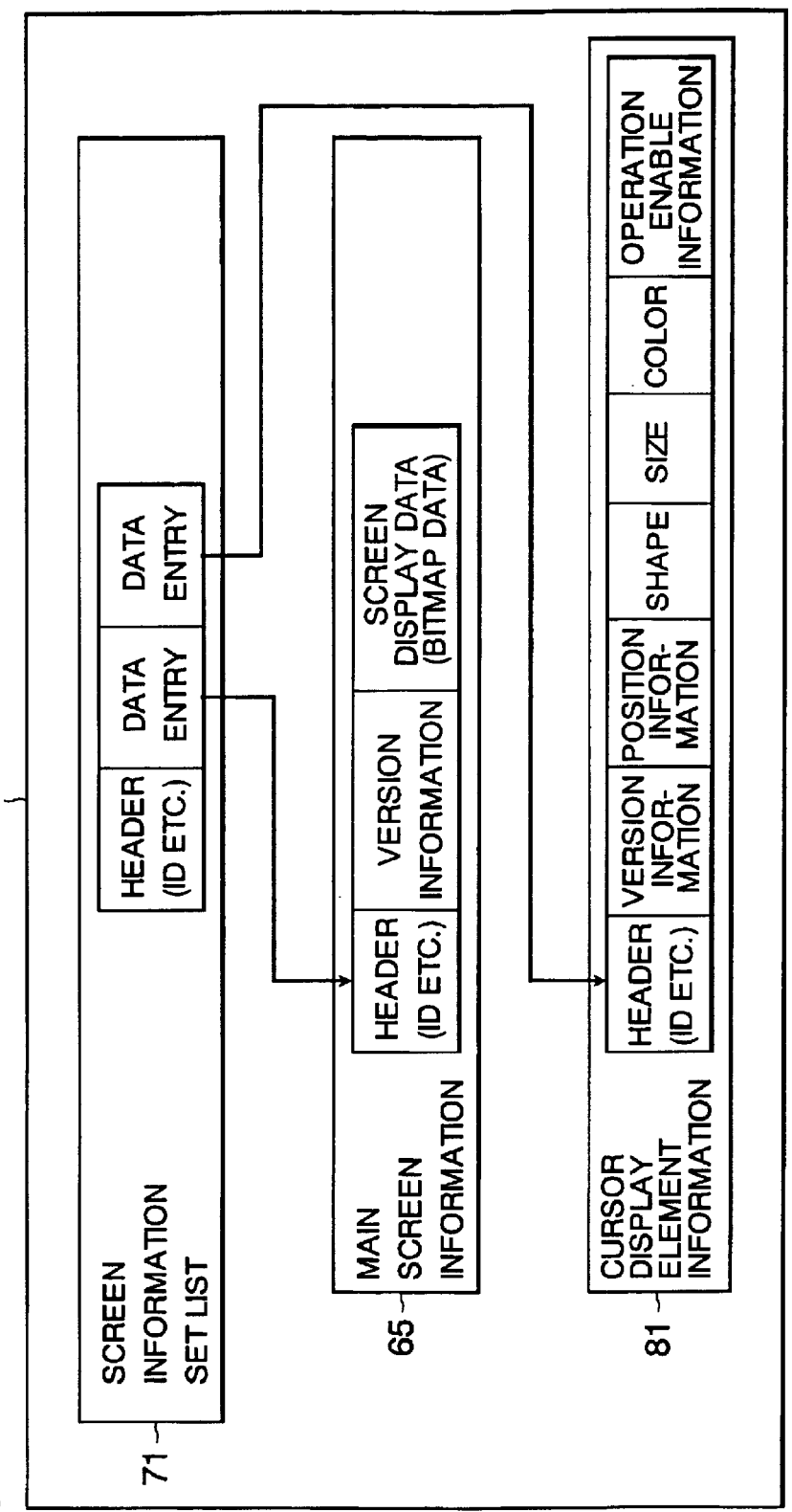
FIG. 19 is a diagram showing the structure of screen information sent from a device to a controller in a fifth embodiment of the present invention.

FIG. 19 is a diagram showing the structure of screen information 55 sent from the device to the controller in the present embodiment. The screen information 55 is constructed of, as in the fourth embodiment, the screen information set list 71, the main screen information 65, and cursor display element information 81. In the present embodiment, the cursor display element is superimposed onto the operating screen for overlap display. In the screen information 55, the screen information set list 71 and the main screen information are similar in internal structure to those in the fourth embodiment. The cursor display element information 81 is similar to that in the fourth embodiment in that a header includes an identifier, version information, and position information. However, instead of the cursor data as bitmap data indicating the cursor display element, the cursor display element information 81 has information indicative of the shape, size, and color of the cursor display element, and further operation enable information. In this sense, the present embodiment is different from the fourth embodiment. Here, the operation enable information is information indicative of the type of operation that the user is allowed to carry out. For example, the operation enable information indicates that the cursor can be moved from the present position only to upward and rightward directions among upward, downward, leftward, and rightward directions.

Figure 20:
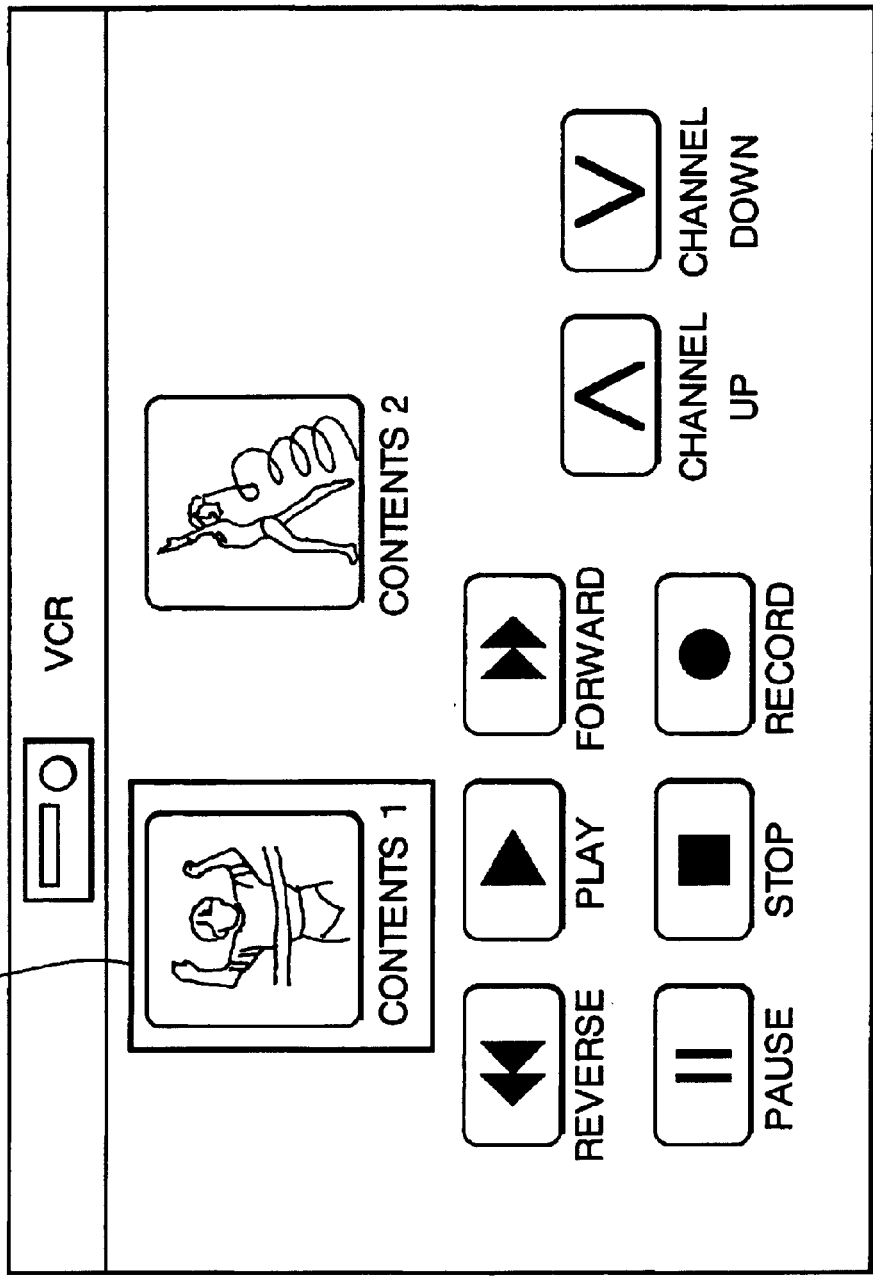
FIG. 20 is a diagram showing one example of an operating screen displayed on the controller in the fifth embodiment.

FIG. 20 is a diagram showing one example of the operating screen displayed on the display screen of the controller in the present embodiment. In this example, the cursor display element 601 is superimposed onto the operating screen itself for overlap display. Here, assuming that the screen with the cursor display element 601 superimposed onto the screen display 500 for overlap display is the operating screen in a broad sense, it can be considered that the screen display data representing this broad operating screen (broad screen display data) is composed of two pieces of partial screen display data corresponding to the screen display 500 and the cursor display element 601. Furthermore, although the cursor display element takes a rectangular shape in the example shown in FIG. 20, it may take other shapes such as circle. Note that, in the present embodiment, bitmap data indicative of the cursor display element does not exist, and the shape, size, and color of the cursor display element is determined according to information included in the cursor display element information 81.

The protocol of the network control system in the present embodiment is basically similar to that in the second embodiment as shown in FIG. 13. In the present embodiment, the screen information 111b sent from the device 200 to the controller 100 as a response to the screen request 101 is structured as shown in FIG. 19. The main screen information 65 and the cursor display element information 81 correspond to different screen display information in the second embodiment. After receiving such screen information, the controller 100 displays the operating screen on the display screen using the screen display data of the main screen information 65, and further superimposes the cursor display element onto the operating screen for overlap display using the information about the shape, size, and color, and the position information in the cursor display element information 81.

After receiving the screen information 111b, when the operator carries out operation to the device through the operating screen as a user interface in the controller 100, the controller 100 transmits to the device 200 the identification information of the screen display data indicative of the operating screen and the operation information indicative of the operation as the operation request 241. Alternatively, before transmitting the operation request 241, the controller 100 may check whether the user operation is allowed or not based on the operation enable information in the cursor display element information 81 received as the screen information 111b. As a result of this check, if the operation is not allowed, the controller 100 does not transmit the operation request 241 but carries out error handling, thereby preventing unnecessary processing. By way of example, if the cursor is located on contents 1 shown in FIG. 20, the operation by the leftward direction arrow key on the remote controller may be made invalid. Alternatively, if the user presses or releases a selection key on the remote controller, not "press", "release", but "select" may be sent to the device as the user operation information. Therefore, the processing of the device can be simplified.

After issuance of the operation request 241, when the state in the device 200 is changed and therefore the screen display data in the device 200 is changed, the device 200 spontaneously transmits to the controller 100 the partial screen information 121b corresponding to a changed part of the screen display data. In the present embodiment, if the cursor display element is changed by operation from the user, only the cursor display element information 81 as shown in FIG. 19 is sent to the controller 100. After receiving, based on the position information and the information indicative of the shape, size, and color included in the cursor display element information 81, the controller 100 superimposes the cursor display element onto the operating screen for overlap display.

As described above, according to the present embodiment, when the cursor display element is changed by operation from the user, the device does not have to send bitmap data such as screen display data to the controller, thereby improving the response speed to the user operation. Furthermore, by setting information indicative of the shape, size, and color included in the cursor display element information 81, it is possible to conform the design of the cursor to the design of each display element on the operating screen.

<Others>

In each of the above described embodiments, units connected to the transmission path 1 are units handling at least one of video, audio, and information. However, units that do not directly relate to either video, audio, or information, such as air conditioner, may be connected to the transmission path 1 as devices to be controlled. The present invention can be applied to a network control system with such units connected thereto.

INDUSTRIAL APPLICABILITY

The present invention is applied to a network control system in which a unit connected to a network is operated through the network. Specifically, the present invention is suitable for a device control system using a graphical user interface (GUI) that supports user's device operation through graphics, characters, etc., on a screen. Such system includes a network control system in which a plurality of AV units are connected to each other a transmission path such as a serial bus of IEEE 1394 standard and one with a GUI controls the other units through the transmission path.

What is claimed is:

1. A network control system comprising:
   a device;
   a first unit having included therein a controller operable to control said device, said controller comprising a user interface including a display; and
   a second unit, connected to said first unit through a transmission path, having said device included therein, wherein at least one of said first unit and said second unit is operable to handle at least one of video data, audio data, and information data,
   wherein said device has screen display data for displaying an operating screen of said device and identification information for identifying the screen display data,
   wherein said device is operable to transmit the screen display data and the identification information to said controller through the transmission path,
   wherein, when a state of said device is changed, said device transmits updated screen display data to said controller, and
   wherein said controller is operable to receive the screen display data and the identification information from said device through the transmission path, to receive the updated screen display data when a state of said device is changed, to instruct said display to display the operating screen using the screen display data, and to update the operating screen upon receiving updated screen display data from said device.

2. A network control system according to claim 1, wherein said controller is further operable to instruct said display to display the operating screen further using the identification information.

3. A network control system according to claim 2, wherein in response to an operation by a user to the operating screen, said controller controls said device by transmitting operation information indicative of the operation and the identification information to said device through the transmission path.

4. The network control system according to claim 2, wherein the identification information includes version information indicating a version of the screen display data.

5. The network control system according to claim 2, wherein the operation information includes operating position information indicative of an operating position on the operating screen.

6. The network control system according to claim 1, wherein the identification information includes version information indicating a version of the screen display data.

7. The network control system according to claim 1, wherein the operation information includes operating position information indicative of an operating position on the operating screen.

8. A network control system according to claim 1, wherein said device further has overlap display data for overlap display on the operating screen, and
   wherein said controller is further operable to instruct said display to display the overlap on the operating screen by using the overlap display data.

9. The network control system according to claim 8, wherein the overlap display data is cursor information for displaying a cursor indicative of a position of operation by the user to the operating screen.

10. The network control system according to claim 9, wherein the cursor information includes position information indicative of a position of the cursor on the operating screen.

11. The network control system according to claim 9, wherein the cursor information includes shape information indicative of a shape of the cursor.

12. The network control system according to claim 9, wherein the cursor information includes size information indicative of a size of the cursor.

13. The network control system according to claim 9, wherein the cursor information includes color information indicative of a color of the cursor.

14. The network control system according to claim 9, wherein the cursor information includes enable information indicating an operation that the user is allowed to perform.

15. The network control system according to claim 8, wherein when a display part corresponding to the overlap display data of said device is changed, said device transmits the overlap display data to said controller and said controller receives the overlap display data from said device through the transmission path and, based on the received overlap display data, updates the operating screen displayed on said display.

16. A network control system according to claim 8, wherein in response to an operation by a user to the operating screen, said controller controls said device by transmitting operation information indicative of the operation and the identification information to said device through the transmission path.

17. A network control system according to claim 1 wherein, in response to an operation by a user to the operating screen, said controller controls said device by transmitting operation information indicative of the operation and the identification information to said device through the transmission path.

18. A network control system comprising:
   a device;
   a first unit, having included therein, a controller for controlling said device, said controller comprising a user interface including a display; and
   a second unit, connected to said first unit through a transmission path, having said device included therein, wherein at least one of said first unit and said second unit is operable to handle at least one of video data, audio data, and information data,
   wherein said device has screen display data composed of a plurality of partial screen display data for displaying an operating screen of said device, wherein said device is operable to transmit the partial screen display data to said controller, through the transmission path, wherein, when a state of said device is changed, said device transmits to said controller through the transmission path, updated partial screen display data corresponding to partial screen display data in which the change of state of said device is to be reflected, and wherein said controller is operable to receive the partial screen display data from said device through the transmission path when a state of said device is changed, to receive the updated partial screen display data, to display the operating screen on said display using the partial screen display data, and to update the partial screen display data, in which the change of state of said device is to be reflected, with the updated partial screen display data.

19. The network control system according to claim 18, wherein when the screen display data of said device is changed, said device transmits changed partial screen display data of the screen display data to said controller and said controller receives the changed partial screen display data from said device through the transmission path and, based on the received partial screen display data, updates the operating screen displayed on said display.

20. The network control system according to claim 18, wherein said device has partial screen identification information for identifying the partial screen display data and is operable to transmit the partial screen display data and the partial screen identification information to said controller through the transmission path, and wherein said controller is operable to receive the partial screen display data and the partial screen identification information from said device through the transmission path.

21. The network control system according to claim 20, wherein when the screen display data of said device is changed, said device transmits changed partial screen display data of the screen display data and the partial screen identification information of the partial screen display data to said controller and said controller receives the changed partial screen display data and the partial screen identification information of the partial screen display data from said device through the transmission path and, based on the received partial screen display data and partial screen identification information, updates the operating screen displayed on said display.

22. The network control system according to claim 20, wherein in response to an operation by a user to the operating screen, said controller controls said device by transmitting operation information indicative of the operation and the partial screen identification information corresponding to the operation to said device through the transmission path.

23. The network control system according to claim 22, wherein the partial screen identification information includes version information indicating a version of the partial screen display data.

24. The network control system according to claim 22, wherein one display element in the screen display is arranged in any one of a plurality of display parts corresponding to the plurality of partial screen display data.

25. The network control system according to claim 22, wherein a display element corresponding to each operation by the user is arranged in any one of a plurality of display parts corresponding to the plurality of partial screen display data.

26. The network control system according to claim 20, wherein the partial screen identification information includes version information indicating a version of the partial screen display data.

27. The network control system according to claim 20, wherein one display element in the screen display is arranged in any one of a plurality of display parts corresponding to the plurality of partial screen display data.

28. The network control system according to claim 20, wherein a display element corresponding to each operation by the user is arranged in any one of a plurality of display parts corresponding to the plurality of partial screen display data.

29. An apparatus operable to be connected via a transmission path to a unit including a controller, said apparatus comprising:

a device operable to be controlled by the controller via the transmission path, wherein at least one of the unit and said apparatus is operable to handle at least one of video data, audio data, and information data, wherein said device has screen display data for displaying an operating screen of said device and identification information for identifying the screen display data, and wherein said device is operable to transmit the screen display data and the identification information to the controller through the transmission path, to transmit updated display data to the controller when a state of said device changes, to receive the identification information of the screen display data and operation information indicative of an operation by a user, and to operate based on the received identification information and operation information.

30. The apparatus according to claim 29, wherein the operation information includes operating position information indicative of a position of operation on the operating screen.

31. The apparatus according to claim 29, wherein said device further has overlap display data for overlap display on the operating screen, and is further operable to transmit the overlap display data to the controller through the transmission path.

32. A first unit operable to be connected via a transmission path to a second unit having a device included therein, said first unit comprising:

a controller operable to control the device, said controller comprising a user interface including a display; and wherein said controller is operable to control the device through the transmission path, wherein at least one of said first unit and the second unit is operable to handle at least one of video data, audio data, and information data, and wherein said controller is further operable to receive screen display data indicative of an operating screen of the device and identification information for identifying the screen display data from the device through the transmission path, to receive updated screen display data from the device when a state of the device changes, to instruct said display to display the operating screen using the screen display data, to instruct said display to update the operating screen on said display when updated display data is received, and, in response to an operation by a user to the operating screen, to control the device by transmitting operation information indicative of the operation and the identification information to the device through the transmission path.

33. The first unit according to claim 32, wherein the operation information includes operating position information indicative of a position of operation on the operating screen.

34. The first unit according to claim 32, wherein said controller is further operable to receive overlap display data for overlap display on the operating screen through the transmission path, and to instruct said display to perform overlap display on the operating screen displayed on said display using the overlap display data.

35. An apparatus operable to be connected via a transmission path to a unit including a controller, said apparatus comprising:

a device operable to be controlled by the controller via the transmission path, wherein at least one of the unit and said apparatus is operable to handle at least one of video data, audio data, and information data, and wherein said device has screen display data comprising a plurality of partial screen display data for displaying an operating screen of said device, is operable to transmit the partial screen display data to the controller through the transmission path when a state of said device changes, is operable to transmit to the controller, through the transmission path, updated partial screen display data corresponding to partial screen display data in which the change of state of said device is to be reflected, is operable to receive operation information indicative of an operation by a user, and is operable to operate based on the received operation information.

36. The apparatus according to claim 35, wherein when the screen display data of said device is changed, said device transmits changed partial screen display data of the screen display data to the controller.

37. A first unit operable to be connected via a transmission path to a second unit having a device, said first unit comprising:

a controller operable to control the device, said controller comprising a user interface including a display, wherein at least one of said first unit and the second unit is operable to handle at least one of video data, audio data, and information data, and wherein said controller is operable to receive a plurality of partial screen display data indicative of an operating screen of the device through the transmission path from the device, is operable to receive updated partial screen display data corresponding to partial screen display data in which a change of state of the device is to be reflected, to display the operating screen on said display using the partial screen display data, to update the operating screen on said display using the updated partial screen display data, and in response to an operation by a user to the operating screen, to control the device by transmitting operation information indicative of the operation through the transmission path to the device.

38. The first unit according to claim 37, wherein when the screen display data of the device is changed, said controller receives changed partial screen display data of the screen display data from the device through the transmission path and, based on the received partial screen display data, updates the operating screen displayed on said display.

39. A method of controlling a device in a network control system in which a first unit and a second unit are connected to each other through a transmission path, at least one of the first unit and the second unit are operable to handle at least one of video data, audio data, and information data, and in which a controller, included in the first unit, controls a device included in the second unit through the transmission path, said control method comprising:

transmitting screen display data for displaying an operating screen of the device and identification information for identifying the screen display data from the device through the transmission path to the controller;

transmitting, when a state of the device changes, updated screen display data for updating an operation screen of the device from the device through the transmission path to the controller;

displaying the operating screen on the controller using the screen display data transmitted from the device; and updating the operating screen on the controller when the controller receives the updated screen display data.

40. A method according to claim 39, wherein said displaying comprises displaying the operating screen on the controller further using the identification information transmitted from the device.

41. A method according to claim 40, further comprising controlling, in response to an operation by a user to the operating screen, the device by transmitting operation information indicative of the operation and the identification information from the controller through the transmission path to the device.

42. A method according to claim 39, wherein said transmitting comprises transmitting overlap data for overlap display on the operating screen from the device through the transmission path to the controller, and wherein said displaying comprises performing overlap display on the displayed operating screen based on the overlap display data by using the screen display data and the overlap display data transmitted from the device.

43. A method according to claim 42, further comprising controlling, in response to an operation by a user to the operating screen, the device by transmitting operation information indicative of the operation and the identification information from the controller through the transmission path to the device.

44. A method according to claim 39, further comprising controlling, in response to an operation by a user to the operating screen, the device by transmitting operation information indicative of the operation and the identification information from the controller through the transmission path to the device.

45. A method of controlling a device in a network control system in which a first unit and a second unit are connected to each other through a transmission path, at least one of the first unit and the second unit are operable to handle at least one of video data, audio data, and information data, and in which a controller, included in the first unit, controls a device included in the second unit through the transmission path, said control method comprising:

transmitting at least one of plurality of partial screen display data composing screen display data for displaying an operating screen of the device from the device through the transmission path to the controller;

when a state of the device is changed, transmitting updated partial screen display data corresponding to partial screen display data in which the change of state of the device is to be reflected;

displaying the operating screen on the controller using the partial screen display data transmitted from the device; and updating the operating screen on the controller using the updated partial screen display data.

* * * * *